US012810238B2

(12) United States Patent
Steiner

(10) Patent No.: US 12,810,238 B2
(45) Date of Patent: Nov. 24, 2026

(54) SYSTEM AND METHOD FOR CONTROLLING THE MOVEMENT OF ITEMS

(71) Applicant: Ocado Innovation Limited, Hatfield (GB)

(72) Inventor: Tim Steiner, Hatfield (GB)

(73) Assignee: Ocado Innovation Limited, Hatfield (GB)

(*) Notice: Subject to any disclaimer, the term of this patent is extended or adjusted under 35 U.S.C. 154(b) by 267 days.

(21) Appl. No.: 17/640,560

(22) PCT Filed: Sep. 4, 2020

(86) PCT No.: PCT/EP2020/074873

§ 371 (c)(1),
(2) Date: Mar. 4, 2022

(87) PCT Pub. No.: WO2021/044036

PCT Pub. Date: Mar. 11, 2021

(65) Prior Publication Data

US 2022/0343265 A1 Oct. 27, 2022

(30) Foreign Application Priority Data

Sep. 5, 2019 (GB) ..................................... 1912750

(51) Int. Cl.
*G06Q 10/08* (2024.01)
*B65G 1/137* (2006.01)
(Continued)

(52) U.S. Cl.
CPC ........... *G06Q 10/087* (2013.01); *G06Q 10/04* (2013.01); *G06Q 10/0833* (2013.01)

(58) Field of Classification Search
CPC ... G06Q 10/087; G06Q 10/04; G06Q 10/0833
See application file for complete search history.

(56) References Cited

U.S. PATENT DOCUMENTS 10,776,750 B2 9/2020 Lindbo et al.
10,817,839 B1 * 10/2020 Clem ................ G06Q 10/0875
(Continued)

FOREIGN PATENT DOCUMENTS

GB 2522846 A 8/2015
JP 2017534990 A * 11/2017 .......... G06Q 10/087
(Continued)

OTHER PUBLICATIONS

Office Action (Request for the Submission of an Opinion) issued on Mar. 26, 2024, by the Korean Patent Office in corresponding Korean Patent Application No. 10-2022-7011274, and an English Translation of the Office Action. (17 pages).
(Continued)

*Primary Examiner* — Talia F Crawley
(74) *Attorney, Agent, or Firm* — Gregory Matt McCloskey

(57) ABSTRACT

The present disclosure provides an apparatus and method for automated controlling of a logistical system such that immediate delivery of items is achieved whilst offering an enhanced range of different types of items to a majority of customers. Exemplary embodiments introduce a virtual distribution centre in which items are shared between fulfilment centres which are located close to a customer. An exemplary system includes at least three fulfilment centres, each fulfilment centre being configured and arranged to fulfil orders to customers and/or stores, and a control unit configured and arranged to control the at least three fulfilment centres. Each of the at least three fulfilment centres is configured and arranged to share items with at least one other of the at least three fulfilment centres.

11 Claims, 10 Drawing Sheets

(51) Int. Cl.

| | |
|---|---|
| ***G06Q 10/04*** | (2023.01) |
| ***G06Q 10/06*** | (2023.01) |
| ***G06Q 10/0833*** | (2023.01) |
| ***G06Q 10/087*** | (2023.01) |

(56) References Cited

U.S. PATENT DOCUMENTS

| | | | | |
|---|---|---|---|---|
| 11,537,976 | B2 * | 12/2022 | Gravelle | G06Q 10/0833 |
| 2002/0138358 | A1 | 9/2002 | Scheer | |
| 2017/0323250 | A1 * | 11/2017 | Lindbo | G06Q 30/0621 |
| 2018/0260883 | A1 * | 9/2018 | Iacono | G06Q 30/0641 |
| 2019/0259043 | A1 | 8/2019 | Koneri et al. | |
| 2019/0266555 | A1 * | 8/2019 | Rajkhowa | B65D 79/02 |
| 2019/0318300 | A1 * | 10/2019 | Cox | G06Q 10/063114 |

FOREIGN PATENT DOCUMENTS

| | | | |
|---|---|---|---|
| JP | 2018156228 | A | 10/2018 |
| JP | 2018181113 | A | 11/2018 |
| KR | 20170078722 | A | 7/2017 |
| WO | 0219046 | A1 | 3/2002 |
| WO | 2016066859 | A1 | 5/2016 |

OTHER PUBLICATIONS

Office Action (Communication) issued on Jun. 27, 2024, by the European Patent Office in corresponding European Patent Application No. 20 764 288.5. (8 pages).

First Office Action issued on May 23, 2023, by the Japanese Patent Office in corresponding Japanese Patent Application No. 2022-514812, and an English Translation of the Office Action. (9 pages).

Melo et al., "Dynamic Multi-Commodity Capacitated Facility Location: A Mathematical Modeling Framework for Strategic Supply Chain Planning", Computers & Operations Research, 2005, vol. 33, pp. 181-208.

Office Action (Examination Report No. 1) issued on Feb. 27, 2023, by the Australian Patent Office in corresponding Australian Patent Application No. 2020343456. (6 pages).

Office Action issued on Mar. 6, 2023, by the Canadian Patent Office in corresponding Canadian Patent Application No. 3,153,664. (5 pages).

Office Action issued on Jan. 2, 2024, by the Canadian Patent Office in corresponding Canadian Patent Application No. 3,153,664. (5 pages).

International Search Report (PCT/ISA/210) and Written Opinion (PCT/ISA/237) mailed on Dec. 17, 2020, by the European Patent Office as the International Searching Authority for International Application No. PCT/EP2020/074873.

Report under Section 17(5)(b) issued in corresponding Application No. GB1912750.5 dated Jan. 31, 2020; and Combined Search Reports under Section 17(5)(b) and Abbreviated Examination Reports under Section 18(3) issued in corresponding Application No. GB2013950.7 dated Jan. 29, 2021.

Office Action (Decision of Rejection) issued on Aug. 29, 2023, by the Japanese Patent Office in corresponding Japanese Patent Application No. 2022-514812, and an English Translation of the Office Action. (5 pages).

Office Action issued on Feb. 20, 2025 by the Canadian Patent Office in corresponding Canadian Application No. 3,153,664 (5 pages) corresponding to Applicant's U.S. Appl. No. 17/640,560.

Office Action issued on Feb. 28, 2025 by the Chinese Patent Office in corresponding Chinese Application No. 202080069838.X (15 pages) corresponding to Applicant's U.S. Appl. No. 17/640,560.

Explorative Investigation of Application Scenarios for Smart Bin Systems by R Vogt et al disclosed at International Conference on Competitive Manufacturing in Stellenbosch, South Africa between Jan. 30, 2019-Feb. 1, 2019.

Office Action issued on Nov. 11, 2025 by the Korean Patent Office in corresponding Korean Application No. 10-2022-7011274 (10 pages) corresponding to Applicant's U.S. Appl. No. 17/640,560.

Office Action issued on Jan. 2, 2025, by the Korean Patent Office in corresponding Korean Patent Application No. 10-2022-7011274. (5 pages).

Office Action issued on Nov. 1, 2022, by the Great Britain Patent Office in corresponding Great Britain Patent Application No. GB2013950.7. (9 pages).

* cited by examiner

SYSTEM AND METHOD FOR CONTROLLING THE MOVEMENT OF ITEMS

This application claims priority from UK Patent Application No. G81912750.5 filed 5 Sep. 2019, the content of all this application hereby being incorporated by reference.

TECHNICAL FIELD

The present invention relates generally to the field of logistics management and more specifically to an apparatus and method for controlling a logistical fulfilment system.

BACKGROUND

Existing systems to automatically control devices for the movement of items is well known. However, as the demand for the transport of items, locally, nationally and globally increases then the management and scalability of such devices becomes increasingly difficult.

One such example concerns the fulfilment of an item for a customer. Traditional fulfilment of such orders follows a "fastest possible" methodology in which the item is collected, packaged and sent to the customer as quickly as possible. In such a scheme an item may be appropriately sent to meet a customer's requested time for delivery, whether it is within one week, one day or one hour. In this sense, such a fulfilment can quickly move individual items to a customer. Although this method works well for single items it fails to take into account further items which the customer has ordered. Therefore, multiple items are sent in multiple packages. As a result the customer needs to expect delivery, typically at different times, of different packages. This may lead to customer dissatisfaction and frustration, as well as increased packaging requirements, transport costs, greenhouse gas emissions etc.

When ordering groceries, such a scheme would be inconvenient for the customer because individual items would be expected at different times. Moreover, it would be uneconomical because grocery orders typically comprise 50 items hence requiring the delivery of 50 separate packages. Therefore the "fastest possible" method is unsuitable.

WO-A1-2016066859 discloses an example device for controlling the movement of items. In particular, a fulfilment decision support system 100, one or more large fulfilment centres 102*a*, 102*n*, one or more small fulfilment centres 104*a*, 104*n*, an inventory management system 106, an order management system 108 and a logistics management system 110 are disclosed.

The fulfilment decision support system 100 supports logistical decisions in relation to the fulfilment of orders and/or the automatic provisioning of instructions related to logistical decisions. The large fulfilment centres 102*a*, 102*n* and small fulfilment centres 104*a*, 104*n* are examples of a hierarchical arrangement of fulfilment centres. The inventory management system 106 generates, updates and/or otherwise stores information related to inventory, such as inventory levels, SKU (stock keeping unit) numbers, inventory status, inventory rules (e.g. expiry dates, fragile goods, hazardous materials), reservations, inventory location, etc. The order management system 108 generates, updates and/or otherwise stores information related to customer orders, such as product, delivery location and delivery time window. The logistics management system 110 generates, updates and/or otherwise stores information related to transportation links and/or transportation vehicles, such as transportation costs, available capacity, available capabilities, traffic congestion, availability of vehicles, fuel costs, insurance costs, driver costs, available transport linkages (e.g. an available truck loading dock at a large fulfilment centre), etc.

In the example of WO-A1-2016066859, as shown in FIG. 2, a hub and spoke model of fulfilment is disclosed. In particular, a large fulfilment centre 102*a* is connected to small fulfilment centres 104*a*, 104*b*, 104*c*, 104*d*, 104*e*, and 104*f*. This diagram shows fulfilment of an example customer order by way of vans.

The large fulfilment centre 102*a* and the small fulfilment centres 104*a*, 104*b*, 104*c*, 104*d*, 104*e*, and 104*f* are arranged and interconnected according to a star (hub-and-spoke) topology.

Such a hub and spoke topology, a centralised model, offers a wide range, great availability with an efficient operating model. In this way, the items in an order are grouped together and the order may be edited over a period of time until finally being shipped to the customer. Moreover, the centralised model provides a majority of "next day service" focussed on orders comprising, typically, 50 items or greater. Although one hour and same-day deliveries can be fulfilled for those customers located very close to the large fulfilment centre, the majority have their orders shipped via a small fulfilment centre which necessarily increases the time of fulfilment and rendering one hour and same day deliveries unavailable for the majority of customers.

Such an operating model provides efficient inbound, low waste and optimal routing through the small fulfilment centres allowing the final few miles of delivery being close to the customer.

However, as expected it is not as quick at shipping items as the "fastest possible" method. In particular, such a hub and spoke model works best for "next-day deliveries" in which a customer receives the entire order one day after placing it. Due to the location and method of transport from large to small fulfilment centres, attempts to decrease delivery times for delivery within a day, and in particular within an hour, are not possible in such a model.

There is therefore a need for fulfilment scheme which is both appropriate for one hour delivery for large orders (comprising many tens of items) but which is scalable, able to offer a large range of different types of items and available to all customers There is also known micro-fulfilment systems which provide fulfilment close to the customer's location. In this way, increased fulfilment efficiency is achieved which reduces a major cost of online grocery. However, it lacks the benefits of a centralised model, in particular, it fails to remove high distribution costs. Moreover, it has lower availability of items, high occupancy costs, smaller breadth of items to choose from and higher waste. Moreover, the burdens of receiving stock and inventory management also increase. Therefore, such a system is not scalable.

SUMMARY

In view of the problems in known fulfilment systems, the present invention aims to provide an apparatus and method for controlling a logistical system such that the immediate delivery of items is achieved whilst offering an enhanced range of different types of items to a majority of customers.

In general terms, the invention introduces a virtual distribution centre in which items are shared between fulfilment centres which are located close to a customer.

According to the present invention there is provided a system comprising at least three fulfilment centres, each fulfilment centre being arranged to fulfil orders to customers and/or stores and a control unit arranged to control the at least three fulfilment centres. Each of the at least three fulfilment centres is arranged to share items with at least one other of the at least three fulfilment centres.

The present invention also provides a control unit for controlling a system as previously described, the control unit comprising a processor arranged to perform the functions of a stock level storing unit, a delivery schedule storing unit, a supplier schedule storing unit, a scheduling unit, a long term forecast storing unit, a promised orders storing unit, a forecasting unit, a projecting unit and a transhipping unit. The stock level storing unit arranged to store information indicative of a stock level of an item held by each of at least three fulfilment centres. The delivery schedule storing unit arranged to store information indicative of scheduled transhipping occurring between the at least three fulfilment centres. The supplier schedule storing unit arranged to store information indicative of scheduled deliveries from an external supplier. The scheduling unit arranged to determine batch schedules based on information stored in each of the stock level storing unit, the delivery schedule storing unit and the supplier schedule storing unit. The long term forecast storing unit arranged to store information indicative of expected trends in demand of an item in each of the at least three fulfilment centres. The promised orders storing unit arranged to store information indicative of an item which customers/stores have reserved. The forecasting unit arranged to forecast a number of each item expected to be demanded by customers/stores based on information stored in the long term forecast storing unit and the promised orders storing unit. The projecting unit arranged to predict an item required and its required locations based on the batch schedules determined by the scheduling unit and the forecast generated by the forecasting unit. The transhipping unit arranged to instruct a particular fulfilment centre to move a determined number of items from one fulfilment centre to another fulfilment centre based on the output of the projecting unit.

The present invention also provides a calculating unit for determining an availability of a particular item held by a system as previously described, the calculating unit comprising a processor arranged to perform the functions of a stock level storing unit, a delivery schedule storing unit, a supplier schedule storing unit, a planning unit, a promised orders, a tracking unit. The stock level storing unit arranged to store information indicative of a stock level of an item held by each of at least three fulfilment centres. The supplier schedule storing unit arranged to store information indicative of scheduled deliveries from an external supplier. The planning unit arranged to determine batch schedules based on information stored in each of the stock level storing unit and the supplier schedule storing unit. The promised orders storing unit arranged to store information indicative of items which customers/stores have reserved. The tracking unit arranged to calculate an availability for each item in the at least three fulfilment centres based on the output of the planning unit and the information stored in the promised orders storing unit.

The present invention also provides method of controlling a system comprising at least three fulfilment centres, each fulfilment centre being arranged to fulfil orders to customers and/or stores and a control unit arranged to control the at least three fulfilment centres. Each of the at least three fulfilment centres is arranged to share items with at least one other of the at least three fulfilment centres. The method comprising the steps of retrieving information indicative of a stock level of an item held by each of at least three fulfilment centres, retrieving information indicative of scheduled transhipping occurring between the at least three fulfilment centres, retrieving information indicative of scheduled deliveries from an external supplier and determining batch schedules based on the retrieved stock level information, scheduled transhipping information and scheduled deliveries information. The method also comprises the steps of retrieving information indicative of expected trends in demand of an item in each of the at least three fulfilment centres, retrieving information indicative of an item which customers/stores have reserved and forecasting a number of each item expected to be demanded by customers/stores based on retrieved expect trends information and reserved items information. Moreover, the method further comprises the steps of predicting an item required and their required locations based on the determined batch schedules the generated forecast and instructing a particular fulfilment centre to move a determined number of items from one fulfilment centre to another fulfilment centre based on the predicted item and its required locations.

The present invention also provides a method of determining an availability of a particular item held by a system comprising at least three fulfilment centres, each fulfilment centre being arranged to fulfil orders to customers and/or stores and a control unit arranged to control the at least three fulfilment centres. Each of the at least three fulfilment centres is arranged to share items with at least one other of the at least three fulfilment centres. The method comprises the steps of retrieving information indicative of a stock level of an item held by each of at least three fulfilment centres, retrieving information indicative of scheduled deliveries from an external supplier and determining batch schedules based on the retrieved stock level information and scheduled deliveries information. Moreover, the method further comprises the steps of retrieving information indicative of items which customers/stores have reserved and calculating an availability for each item in the at least three fulfilment centres based on the determined batch schedules and the retrieved reserved items information.

BRIEF DESCRIPTION OF THE DRAWINGS

Embodiments of the invention will now be described by way of example only with reference to the accompanying drawings, in which like reference numbers designate the same or corresponding parts, and in which.

DETAILED DESCRIPTION OF EMBODIMENTS

First Embodiment

Network Structure

Figure 1:
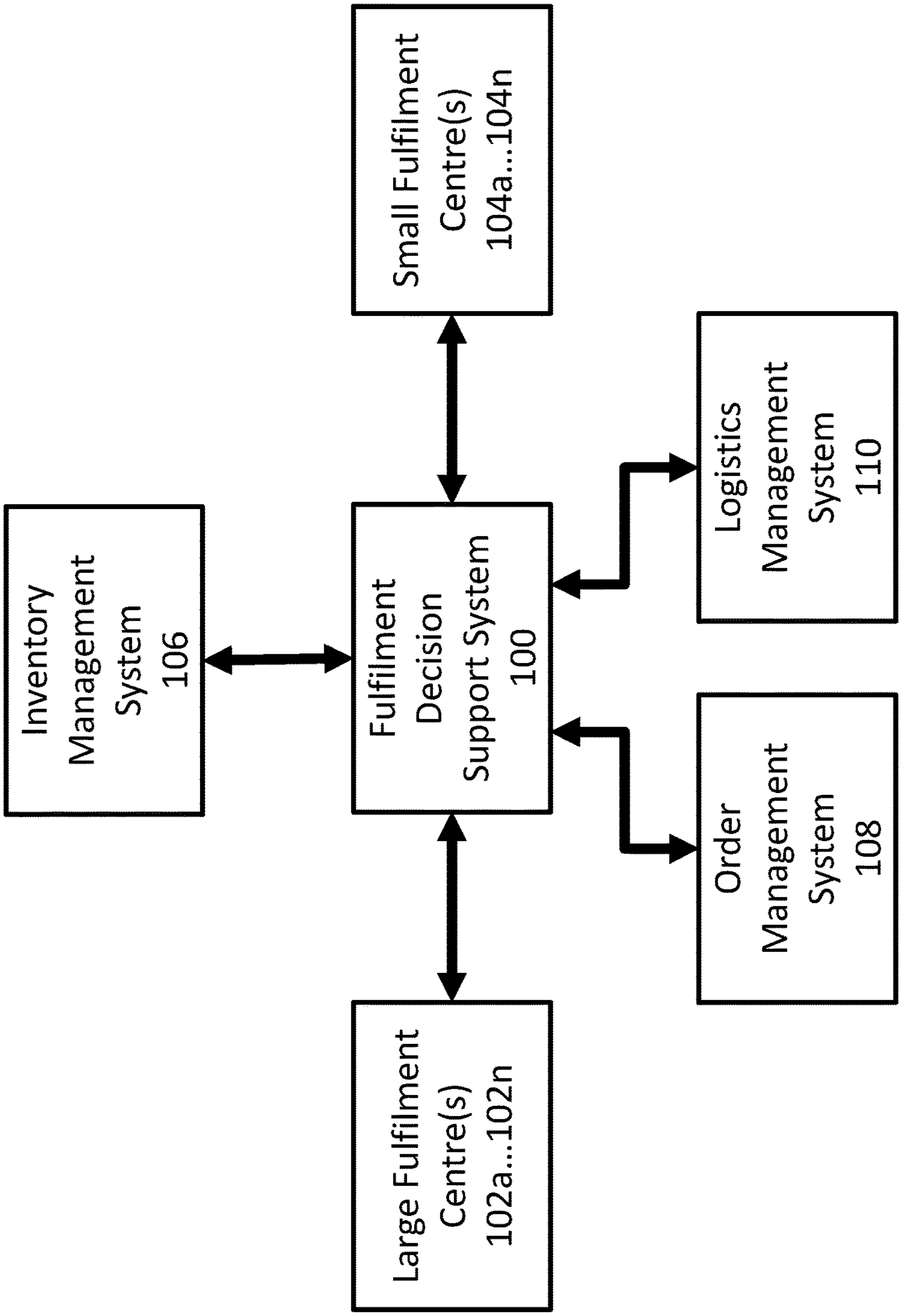
FIG. 1 is a block schematic diagram of a known logistics arrangement.
Figure 2:
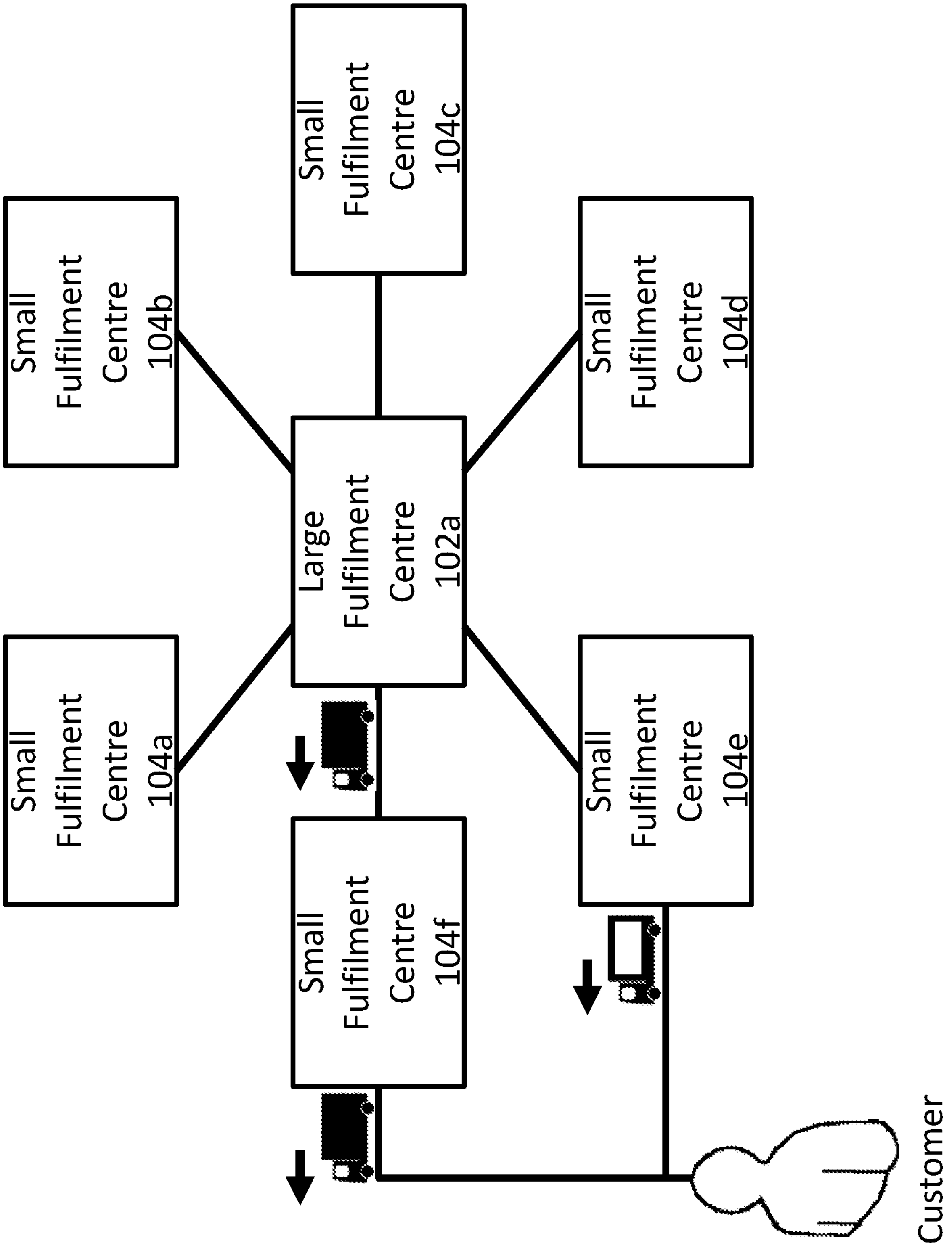
FIG. 2 is a schematic diagram of a large fulfilment centre that is connected to a number of small fulfilment centres in a hub and spoke manner, according to a known logistics arrangement.
Figure 3:
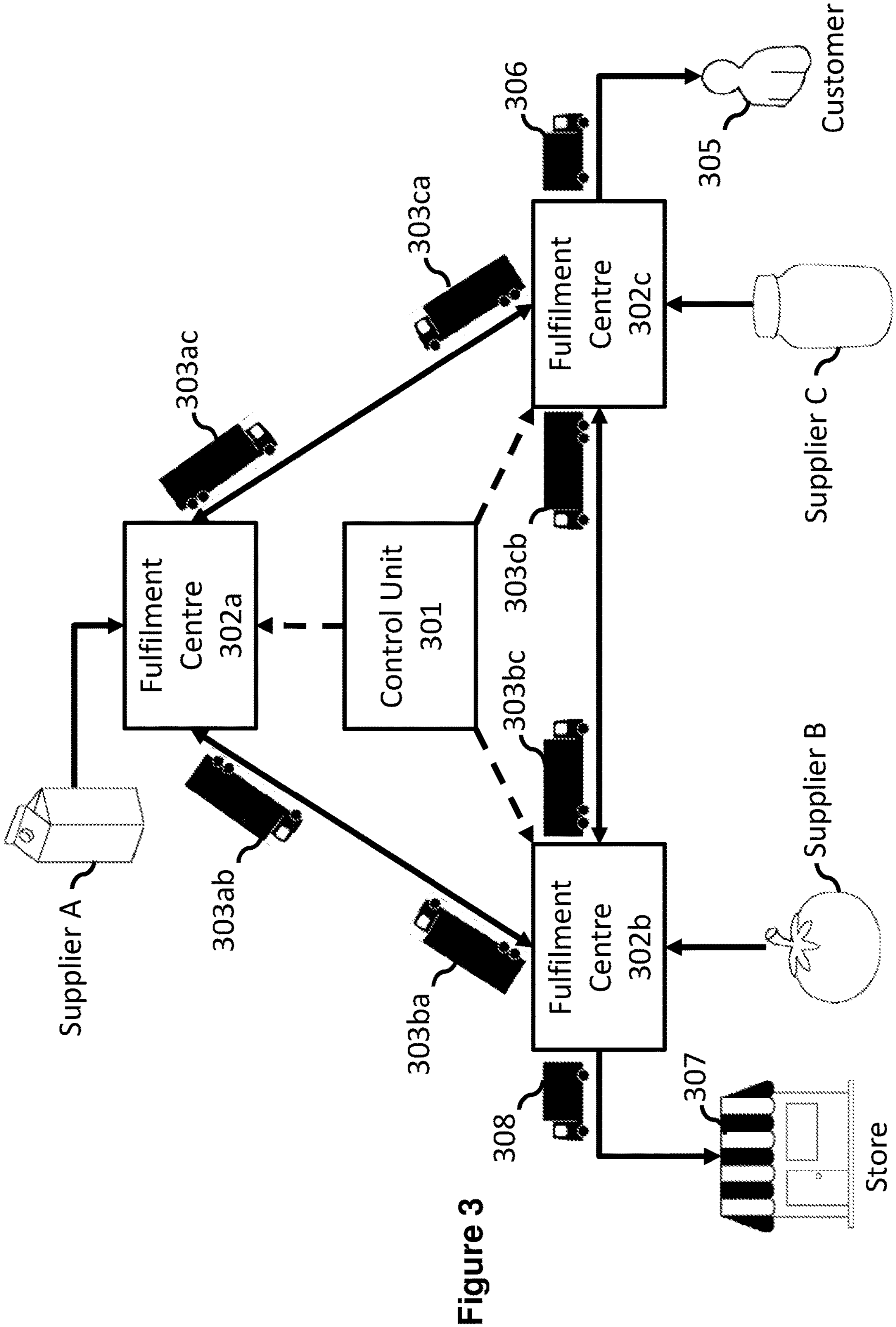
FIG. 3 is a schematic diagram of a control unit according to a first embodiment of the present invention together with a number of fulfilment centres arranged in a mesh configuration.

FIG. 3 shows a control unit 301 according to a first embodiment of the present invention together with other apparatuses to be controlled thereby. In particular, three fulfilment centres 302*a*-302*c* are shown together with vehicles for the transport of items between the fulfilment centres. As shown the first fulfilment centre 302*a* is shown with a vehicle 303*ab* to travel to the second fulfilment centre 302*b* and a vehicle 303*ac* to travel to the third fulfilment centre 302*c*. Similarly, the second fulfilment centre 302*b* is shown with vehicle 303*ba* and vehicle 303*bc* which travel to the first and third fulfilment centres respectively. Moreover, the third fulfilment centre 302*c* is shown with vehicle 303*ca* and vehicle 303*cb* which travel to the first and second fulfilment centres respectively. The actions performed by each fulfilment centres and the movement of vehicle together with their cargo is controlled by the control unit 301.

FIG. 3 further shows exemplary supplies of items into each fulfilment centre. For example, Supplier A providing cartons of produce are supplied to the first fulfilment centre 302*a* but not to the other fulfilment centres. Similarly, Supplier B provides fresh fruit and vegetable items into the second fulfilment centre 302*b* but not to other fulfilment centres. Fulfilment centre 302*c* receives from Supplier C jars of produce which are not supplied to other fulfilment centres. It is envisaged that the types of produce and their supply to individual fulfilment centre is provided herein as examples only. Other arrangements of supply to each fulfilment centre are envisaged as required by each supplier, fulfilment centre and type of item.

By way of example, a customer 305 is shown having their order fulfilled by a vehicle 306 dispatched from the third fulfilment centre 302*c*. It is envisaged that each fulfilment centre supplies orders to customer as required (such as when a customer places an order) and that the example of orders being supplied to customers through the third fulfilment centre 302*c* is an example only i.e. each of the first and second fulfilment centres can also supply a customer's order. To this end, if the customer 305 has ordered each of the items supplied by Suppliers A, B and C, namely a carton of produce, fresh produce and a jar of produce then the sharing of items between each of the fulfilment centres is required to group all of the ordered items together in one location for dispatch on vehicle 306. To achieve this, the third fulfilment centre 302*c* receives from the first fulfilment centre 302*a* a number of the items supplied by Supplier A which have been transferred on vehicle 303*ac*. Similarly, the third fulfilment centre 302*c* receives from the second fulfilment centre 302*b* items from the Supplier B as transferred on vehicle 303*bc*.

As explained previously, "fastest possible" dispatch is not feasible for grocery delivery given the number of items for dispatch (typically over 50 items) and that each item has a use-by date and freshness must be maintained. Therefore, the items are grouped together in one location for dispatch to the customer in a single delivery by way of vehicle 306. Previously this was achieved using a centralised warehouse and a number of smaller sites in a hub and spoke arrangement. However, this only works well for next-day deliveries. On the other hand, the use of the fulfilment centres 302*a*-302*c* arranged to share items provides the advantages of "fastest possible" dispatch but in a manner suitable for grocery items. To achieve this, each of the fulfilment centres is located relatively close to the location of the customer 305. In this way, next-day deliveries are still possible—as with the hub and spoke arrangement. However, due to the proximity to the customer same day delivery (typically delivery in 4 or more hours), short lead time (between 1 and 4 hours) and immediate delivery (within 1 hour) are all possible. Such an arrangement is achievable because the fulfilment centres 302*a*-302*c* are of a smaller size as compared to those used in a hub and spoke arrangement which permits installation in locations close to the customer 305. Typically, this would necessitate the offering of a reduced range of items and/or reduced ability to fulfil a large number of orders per hour. However, due to the sharing of stock between fulfilment centres as controlled by the control unit 301 then the same range of items and the same number of orders per hour as compared to the centralised fulfilment centre of the hub and spoke arrangement may be achieved whilst providing immediacy (within 1 hour) delivery to the customer 305.

Similarly, FIG. 3 shows a store 307 which may be restocked by a vehicle 308 travelling from a second fulfilment centre 302*b*. In this regard, the store 307 may be treated by the control unit 301 as a customer 305 which order items for delivery at a particular time. In this regard the store 307 may be resupplied by any fulfilment centre located nearby within a suitable time frame, such as next-day delivery, same day delivery, short lead time and immediate delivery.

Moreover, each fulfilment centre is treated as interchangeable. Although FIG. 3 shows store resupply occurring from second fulfilment centre 302*b* it is envisaged that each of first fulfilment centre 302*a* and third fulfilment centre 302*c* are equally capable of utilising a vehicle 308 to resupply a store. Similarly, customer orders can be fulfilled directly from each of first fulfilment centre 302*a* and second fulfilment centre 302*b* as appropriate, for example, when a customer is located closest to either of the first fulfilment centre 302*a* and the second fulfilment centre 302*b* as compared to the third fulfilment centre 302*c*.

Regarding supplier deliveries to each fulfilment centre, it is expected that, in many cases, a supplier will supply their items to a fulfilment centre located close to their shipping location. For example, Supplier A is generally expected to only supply carton items to the first fulfilment centre 302*a* and not to the other fulfilment centres. In this way, benefits are realised for Supplier A who is not required to incur further shipments of items to other fulfilment centres nor manage the balance of stock levels between fulfilment centres. Instead, the control unit 301 is arranged to instruct vehicles 303*ab*, 303*ac* to supply the second and third fulfilment centres 302$b$, 302$c$ with appropriate numbers of cartons as required by their outgoing orders to customers and stores. Similarly, Supplier B is expected to only supply fresh produce to the second fulfilment centre 302$b$ which is located close to Supplier B. In turn the second fulfilment centre 302$b$ is arranged to restock the level of fresh produce in each of the first and third fulfilment centres 302$a$, 302$c$. The same applies with regards to Supplier C and the third fulfilment centre 302$c$.

Moreover, the control unit 301 may be further arranged to cause vehicles 303 to move between fulfilment centres on a predetermined schedule. For example, the vehicles 303 may be instructed to move between fulfilment centres every four hours. In particular, a vehicle 303$ac$ may be instructed to move from the first fulfilment centre 303$ac$ the third fulfilment centre 302$c$ every four hours. Similarly, a plurality of vehicles may be instructed to leave each fulfilment centre every four hours to move to a different fulfilment centre. For example, vehicle 303$ca$ from the third fulfilment centre 302$c$ to the first fulfilment centre 302$a$, vehicle 303$cb$ from the third fulfilment centre 302$c$ to the second fulfilment centre 302$b$, vehicle 303$ba$ from the second fulfilment centre 302$b$ to the first fulfilment centre 302$a$, vehicle 303$ab$ from the first fulfilment centre 302$a$ to the second fulfilment centre 302$b$, vehicle 303$bc$ from the second fulfilment centre 303$bc$ to the third fulfilment centre 302$c$ and the like. In this way, items can be effectively shared between fulfilment centres on predetermined schedules.

FIG. 3 shows the use of three fulfilment centres 302$a$-302$c$. In this way, the fulfilment centres form a network in which items may be transferred from one fulfilment centre to another using a vehicle, such as a lorry although other vehicles are envisaged. Moreover, other types of transportation are envisaged such as vans, cars, trains, airplanes and automated and magnetically driven/levitated vehicles. In this regard, any means suitable of transferring items from one fulfilment centre to another is envisaged to be used for this purpose. In this example, each fulfilment centre may be arranged to directly share items between all other fulfilment centres, in other words, the fulfilment centres may be arranged in a mesh network with each fulfilment centre being 'connected' with every other fulfilment centre.

It is envisaged that once a vehicle travels from, for example, a first fulfilment centre 302$a$ to a second fulfilment centre 302$b$ it may be unloaded and then reloaded to travel back to the first fulfilment centre 302$a$. In this regard, when a vehicle travels a substantial proportion (preferably all) of the capacity of the vehicle is utilised for the movement of items. By way of comparison, the hub and spoke model only utilises capacity from the centralised hub to each spoke. The return journey from the spoke to the hub is not efficient because the vehicles are not used to transport items. Therefore, the first embodiment of the present invention provides a higher average fill of vehicle compared to the hub and spoke model. Moreover, through careful scheduling, each fulfilment centre may be used to a higher capacity. For example, vehicles may be used to transport items for store replenishment during the night e.g. 10 pm until 6 am which are the times at which orders for delivery direct to customers are the lowest. Same day deliveries may be transported during the day so that they are ready for delivery to a customer in an evening e.g. after 7 pm. In this regard, by continuously transhipping items between fulfilment centres the best use of such fulfilment centres may be utilised. Transhipping stock allows customers/stores to have access to wide range with great availability.

The fulfilment centres are typically of substantially the same size, i.e. able to handle substantially the same number of orders per hour and to store substantially the same number of items. In this way, each fulfilment centre are substantially equal but positioned in different geographical locations with respect to each other. However, the system described herein operates efficiently with fulfilment centres of differing sizes. A hub and spoke system of order fulfilment relies on a hierarchy of fulfilment centres with a large fulfilment centre (in terms of a large number of orders which may be processed per hour, a large item storing ability and a large range of items stored therein) shipping customer orders to a plurality of small fulfilment centres (which have reduced order per hour processing and item storing abilities as compared to the large fulfilment centre). The large fulfilment centre, due to its size, is typically located far away from population centres whilst small fulfilment centres are located closer to population centres where the costs of operation and/or the costs of inventory space may be higher.

On the other hand, the fulfilment centres in the first embodiment of the present invention are envisaged to be, typically, of a medium size (in terms of a medium number of orders which may be processed per hour and a medium item storing ability) as compared to the hub and spoke system. Instead of a single large fulfilment centre, three medium fulfilment centres arranged in a mesh provide improved functionality for both suppliers and customers as will be explained in more detail.

Although three fulfilment centres are depicted, it is envisaged that more than three fulfilment centres may be used. Each of the fulfilment centres transport items from each of the fulfilment centres to every other of the fulfilment centres as organised by the control unit 301.

The fulfilment centres 302$a$-302$c$ may have various capabilities associated with logistics and supply chain needs, such as a high level of automation and/or mechanised processes. The fulfilment centres may also be operated for a greater number of hours per day, and may be operated in conjunction with transport vehicles.

A variety of transport vehicles may be used for the transporting of goods between fulfilment centres, to customers, from suppliers, to suppliers, etc. These transportation links may be of various types, such as automobiles, trucks, trains, ferries, airplanes, helicopters, couriers, etc. There may be transport vehicles of differing capabilities, capacities, limitations, sizes and/or operational costs. In some embodiments, some transport vehicles also have additional equipment suitable for various capabilities, such as refrigeration, air cushioning, vibration resistance, hazardous chemical transportation, etc.

Products provided by suppliers may come in containers having a large quantity of homogeneous items. Such containers may be standardised containers, which may be adapted for ready storage, transport, and/or to interface with automated systems of fulfilment centres (e.g. for picking, packing, etc.). An issue may arise in providing such containers to other fulfilment centres where the homogeneous items are items which are slow sellers. For example, if storage space is at a premium at the fulfilment centre, inventory space that could otherwise be used for storing other goods may be taken up by a non-optimal number of the slow seller items. So, as further detailed below, goods may be repackaged at a fulfilment centre into standardised containers containing a heterogeneous mix of items.

In some embodiments, the goods may be initially received at a fulfilment centre. The goods may be received in standardised containers, or the goods may be received otherwise (e.g. on pallets) and transferred into standardised containers upon arrival at a fulfilment centre. Goods may be sorted into various containers for storage at the fulfilment centre. For example, a first product may be sorted into a first container for storage, while a second product may be sorted into a second container for storage.

Standardised containers may be provided in one or more predefined sizes. Conveniently, the use of standardised containers having predefined sizes may allow the containers to be readily manipulated by a mechanised storage and retrieval system provided at a fulfilment centre in accordance with some embodiments. In some embodiments, there may be a similar mechanised storage and retrieval system provided at another fulfilment centre or a collection point.

In some embodiments, a mechanised storage and retrieval system may include a plurality of inventory management devices adapted to manipulate inventory, e.g. as part of various inventory management processes performed at a fulfilment centre, e.g. a pick process, a pack process, a sort process, a space optimization process, etc. So, an inventory management device may be configured to manipulate (e.g. move, load, unload, retrieve, carry, rotate, roll, dock, undock, lift, or otherwise handle) containers, groups of containers, or goods contained therein. For example, the inventory management device may be configured to move a container from one location in a fulfilment centre to another location in the fulfilment centre. In an embodiment, one or more of the inventory management devices may be devices configured to autonomously move through a fulfilment centre, and thereby move a container. The one or more inventory management devices may also be automated for other types of tasks and/or actions (e.g. docking with containers, undocking with containers, lifting containers, interfacing with containers, transferring containers to other types of equipment).

In some embodiments, the standardised containers may be configured to interface with one or more of the inventory management devices. For example, the standardised containers may include various structural features, such as recesses, protrusions, fastening mechanisms, securing mechanisms, rollers, electrical connections, etc. that may be utilized for interfacing with the inventory management devices, for manipulation thereby.

In some embodiments, the standardised container may also be housed in a container holding one or more standardised containers, which may be configured for interaction with one or more of the inventory management devices. For example, a number of standardised containers may be placed into a single container and moved together by an inventory management device. In some embodiments, the standardised containers may be stacked and moved together. The standardised containers may also be configured for securing with one another.

In some embodiments, a container used to transfer goods may be selected from a set of standardised containers of at least one predefined size. So, in one example workflow, goods may be picked from one or more standardised containers for packing into other standardised container(s).

Conveniently, the use of standardised containers having predefined sizes may allow the containers to be readily manipulated by a mechanised storage and retrieval system provided at a fulfilment centre in accordance with some embodiments. These standardised containers may interface with one or more of the inventory management devices provided as part of the mechanised storage and retrieval system at a fulfilment centre, e.g. to be manipulated at the fulfilment centre. For example, a standardised container transported from a fulfilment centre to another fulfilment centre may be moved by an inventory management device upon receipt at the fulfilment centre.

The use of a network of fulfilment centres, as shown in FIG. 3, provides an efficient large scale supplier inbound, similar to hub and spoke centralised fulfilment centres. Moreover, transhipping provides the ability to efficiently move stock between fulfilment centres with no minimum order quantities in order to maximise range offering whilst still promising great availability and freshness to the customer with low waste. Moreover, the ongoing transhipping between fulfilment centres enables efficient scheduled transhipping as well as placing last minute 'bets' to improve availability and reduce purge with the ability to re-distribute stock to maximise sales when forecast does not equal demand. As described previously, the use of automated storage and retrieval systems provides for an automated tranship decant process at each fulfilment centre to improve productivity for an inbound operation with a thin stockholding.

The network of fulfilment centres as controlled by the control unit 301 of the first embodiment enables an efficient operation driven by large direct supplier deliveries, an efficient inbound operation and low waste combined with low occupancy rates for large out of town sites. For the consumer this enables a large range, great availability and improved freshness. For next day deliveries, later same day deliveries and store replenishment this provides an increased efficiency of operation. Moreover, stock is provided closer to the customer, enabling short lead time orders but still with the same range offering. Transport costs are reduced as vehicles run closer to capacity for all legs of a journey. Vehicles have a higher average fill versus hub and spoke model.

Figure 4:
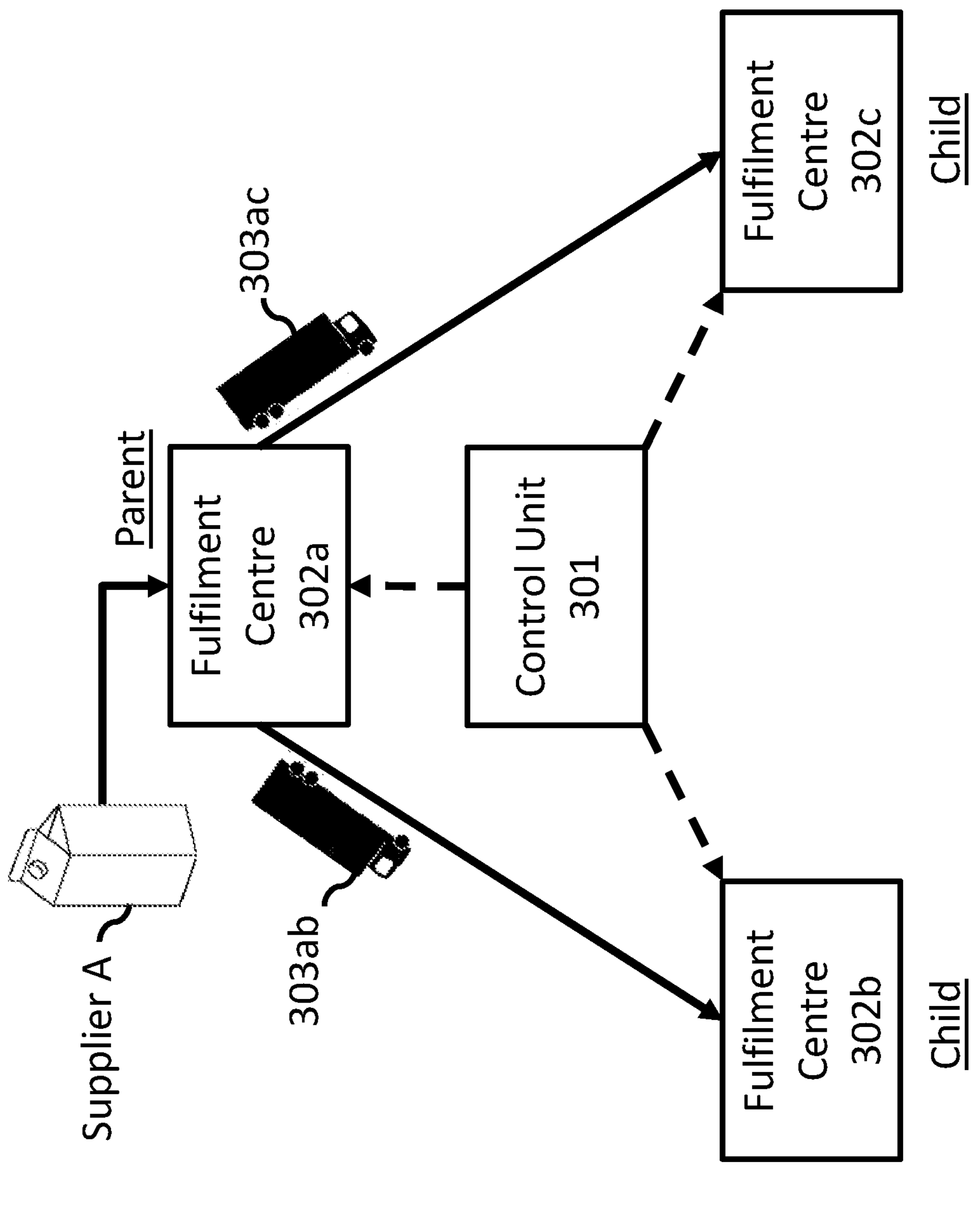
FIG. 4 is a schematic diagram of part of the network of fulfilment centres shown in FIG. 3 whilst performing the operation of push-type transhipping.

FIG. 4 shows a procedure of transhipping as controlled by the control unit 301. In particular, the type of transhipping depicted in FIG. 4 is referred to as push-type transhipping. Push-type transhipping occurs between fulfilment centres to move items which have only been delivered by a supplier to a single fulfilment centre. In this regard, the fulfilment centre which receives the item from the supplier is named the 'parent' fulfilment centre and the fulfilment centre(s) which receives the items from the parent fulfilment centre is named a 'child' fulfilment centre. In this regard it is envisaged that a particular fulfilment centre will be a parent for some items but a child for ones. For example, as shown in FIG. 3, the first fulfilment centre 302*a* is a parent from carton items but a child for jar items and produce items. Similarly, second fulfilment centre 302*b* is a parent for produce items and a child for carton items and jar items.

It is envisaged that for some items it may be desirable to have a supplier deliver items to all of the fulfilment centres. In other words, parent and child fulfilment centre may not be used for all items. This is generally applicable to items with short shelf lives i.e. those items which can only last a short period in a fulfilment centre before having to be discarded. For example, a yoghurt item can typically only last a short time in a fulfilment centre and therefore may be best delivered by the supplier to all fulfilment centres in the network and not transhipped.

In addition, some items may be best delivered to multiple fulfilment centres but not all fulfilment centres. In other words, more than one fulfilment centres may act as the parent for an item. For example, first fulfilment centre 302*a* may receive a particular item from a supplier on one day of the week (for example, Monday) whilst the second fulfilment centre 302*b* receives the same particular item from the supplier on another day of the week (for example, Wednesday). Transhipping may then be used to distribute the item to the third fulfilment centre 302*c*.

Moreover, the parent fulfilment centre for particular items may dynamically change (and be assigned by the control unit 301 as required). In other words, the parent fulfilment centre may be dynamically recommended/executes by the control unit 301 so as to best balance the flow of items through the network of fulfilment centres.

The typical case is shown in FIG. 4. In this example, Supplier A has been instructed to provide carton items to the first fulfilment centre 302*a* but not the other fulfilment centres. Given that customers/stores may require the carton items for delivery but are located closer to other fulfilment centres than the first fulfilment centre 302*a* then the control unit 301 arranges for the transhipping of the carton items from the first fulfilment centre 302*a* to each of the second fulfilment centre 302*b* and third fulfilment centre 302*c* by way of vehicle 303*ab* and vehicle 303*ac* respectively. In this way, items are input into the network of fulfilment centres through a single fulfilment centre only and cascaded to other fulfilment centres using the intra-network shipping. To this end, the control unit 301 calculates and instructs the parent fulfilment centre to ship a calculated amount of carton items to individual fulfilment centres. As will be explained later, the amount that is shipped to individual fulfilment centres is calculated by the control unit 301 such that each fulfilment centre receives an accurate number of items as dictated by the demand for such items at each fulfilment centre. As has previously been explained, it is envisaged that items are moved from one fulfilment centre to another one in standardised containers. For example, each standardised container is arranged to contain a single type of item, i.e. a single stock keeping unit. Therefore, it is envisaged the carton items are decanted into standardised containers at the first fulfilment centre 302*a*. The standardised containers may then be transferred between fulfilment centres to thereby transfer items in a convenient manner.

By using the transhipping procedure depicted in FIG. 4 more efficient operation is achieved by utilising large direct supplier deliveries providing an efficient inbound operations and low waste. Locating fulfilment centres close to customers enable short lead time orders with the same range offering as the centralised model. In this way, the customer is provided with a large range of items, enhanced availability and improved freshness of items.

As explained, transport costs are reduced as compared to hub and spoke models. Moreover, the vehicles have an increased average fill.

Push-type transhipping is designed to redistribute stock around the network of fulfilment centres in an efficient manner. To this end, the control unit 301 is arranged to determine the amount of stock in each fulfilment centre and their stock projections and decide how much excess stock the fulfilment centre has. The excess stock may be redistributed to fulfilment centres which need the stock the most. To this end, push-type transhipping may be described as redistribution shipping arranged to ship longer life stock by considering a longer time frame. Typically, this occurs immediately after delivery of stock at a parent fulfilment centre. However, it may be delayed if necessary to thereby smooth out the transhipping of items thereby increasing the fill of vehicles.

It is envisaged that push-type transhipping may be a one-way process (for a particular product from a particular supplier) by which stock is shared from the parent fulfilment centre to children fulfilment centres. In another example, a two-way process may be employed.

Figure 5:
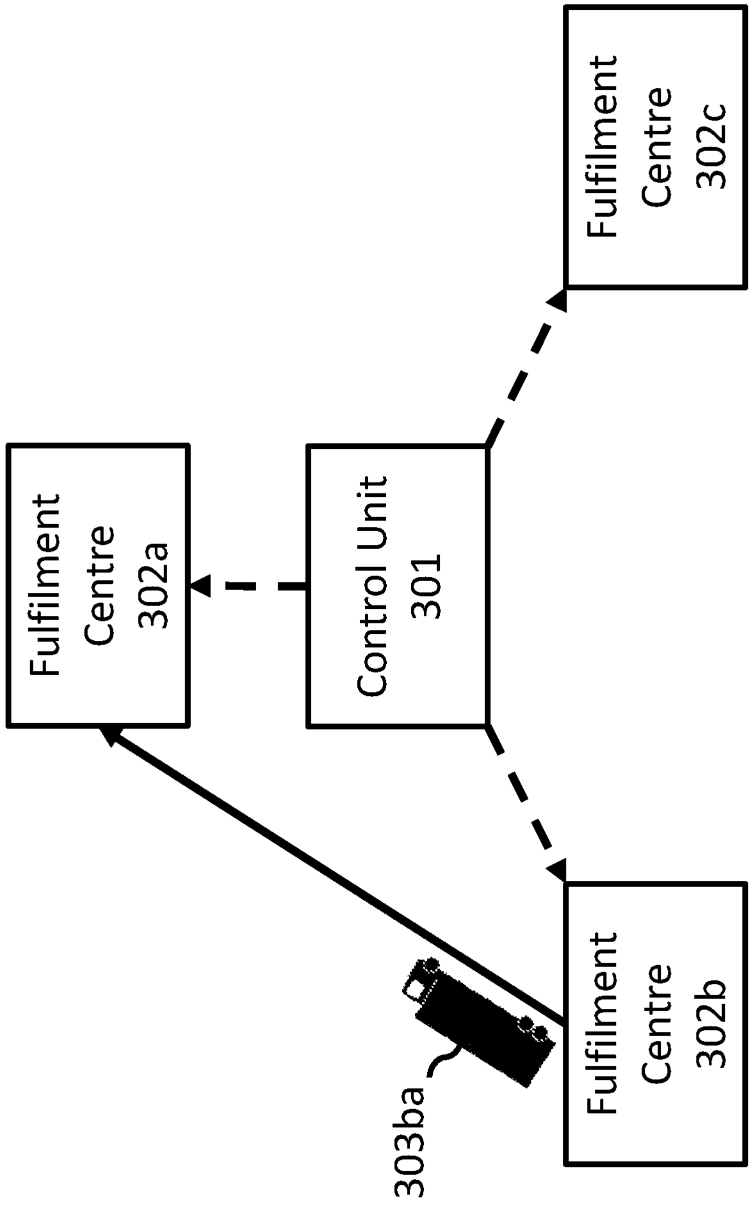
FIG. 5 is a schematic diagram of part of the network of fulfilment centres shown in FIG. 3 whilst performing the operation of pull-type transhipping.

FIG. 5 shows a further procedure of transhipping as controlled by the control unit 301. This type of transhipping is referred to as pull-type transhipping. Pull-type transhipping occurs between fulfilment centres when the number of a particular item in a fulfilment centre are insufficient to supply a customer/store order. Therefore, the control unit 301 is arranged to have one fulfilment centre supply the items required to the fulfilment centre requiring the items. For example, as shown in FIG. 5, the second fulfilment centre 302*b* is arranged to supply items using a vehicle 303*ba* to the first fulfilment centre 302*a*. It is envisaged that the vehicle 302*ba* is not used exclusively for this purpose but also used to include other items which have been determined by the control unit 301 which are to be transported to the first fulfilment centre 302*a* as well as for use in transhipping items between fulfilment centres, such as supply fresh produce provided by Supplier B to the second fulfilment centre 302*b* and which requires distribution to the first fulfilment centre 302*a*. In this way, transporting capacity in the vehicle is maximised.

In an example, a customer may order (together with other items) a jar item. The control unit 301 may calculate that, given the customer's location, the order is to be fulfilled from the first fulfilment centre 302*a*. As explained previously, neither the first fulfilment centre 302*a* nor second fulfilment centre 302*b* receive from Supplier C the jar items. Instead, the items are delivered directly to the third fulfilment centre 302*c* which in turn tranships the jar items to every other fulfilment centre. Therefore, each fulfilment centre holds a particular stock of jar items as determined by the control unit 301. The control unit 301 is further arranged to assign portions of such stock to customer/store orders for dispatch as necessary. In this regard, the control unit 301 may determine the stock level of jar items based on the number which are in-stock, soon to be in stock (e.g. soon to be received from suppliers), number in-stock at other fulfilment centres to determine an 'Availability to Promise' which indicates whether a customer is able to order the item for dispatch. The 'Availability to Promise' aspect of the first embodiment will be described in more detail later. Therefore, the first embodiment of the present invention provides the advantage that even stock not currently held in the fulfilment centre used for delivery is transhipped from additional stock of other fulfilment centres by way of the vehicles which continuously move between fulfilment centres on a particular schedule (for example every four hours). Therefore, with reference to FIG. 5, for the first fulfilment centre 302*a* to fulfil the customer order for jar items, the control unit 301 is arranged to tranship the jar items (as a pull-type tranship) from the second fulfilment centre 302*b* which will be delivered to the first fulfilment centre 302*a* by way of vehicle 303*ba* moving on a predetermined schedule. In this way, unexpected increases in demand for particular items (which may not be held in stock levels of sufficient quantity) at each fulfilment centre may be met by the sharing of stock between fulfilment centres using vehicles which are moving between the fulfilment centres on a predetermined schedule.

Moreover, pull-type transhipping is typically used for short term orders designed to meet customer demand in the near future. The control unit 301 is arranged to predict the required stock level in each fulfilment centre based on stock projections, forecasts and transhipment supplier schedules for each fulfilment centre. To this end, the control unit 301 thereby choose the correct candidate to fulfil the orders— which is typically the parent fulfilment centre for the particular item. To this end, pull-type transhipping may be described as top up shipping.

Figure 6:
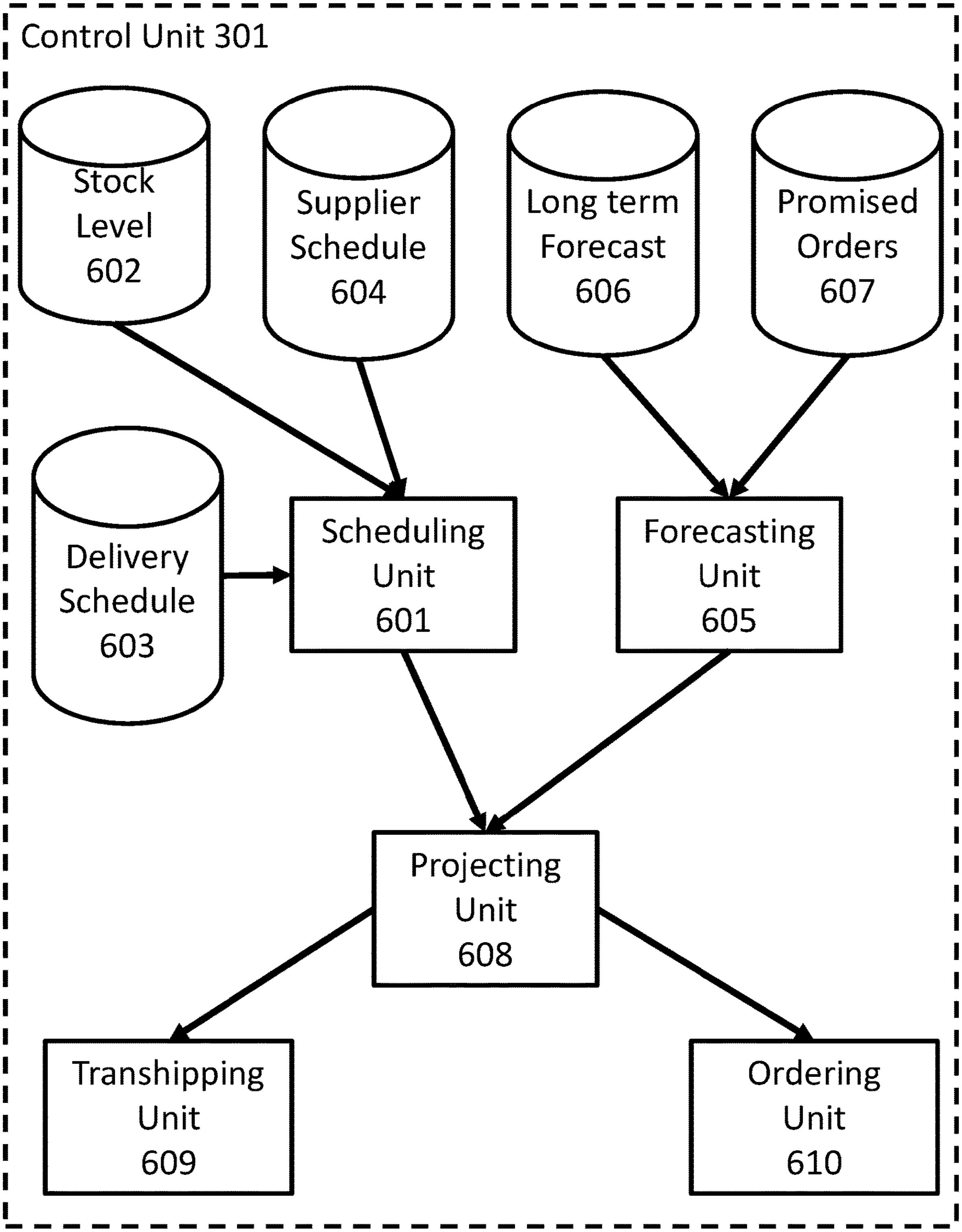
FIG. 6 is a schematic diagram of components utilised in a control unit according to a first embodiment of the present invention.

FIG. 6 shows an implementation of the control unit 301 according to the first embedment of the present invention. In particular, the control unit 301 comprises a scheduling unit 601, a stock level storing unit 602, a delivery schedule storing unit 603 and a supplier schedule storing unit 604. Moreover, the control unit 301 further comprises a forecasting unit 605, a long term forecast storing unit 606 and a promised orders storing unit 607. In addition, the control unit 301 further comprises a projecting unit 608, a transhipping unit 609 and an ordering unit 610.

The scheduling unit 601 is arranged determine batch schedules which relate to the amount of stock of each item held in each fulfilment centre together with information about stock arriving from suppliers and, for each fulfilment centre, whether stock is available to arrive in a vehicle by way of transhipping. To this end, the scheduling unit 601 is arranged to communicate with a stock level storing unit 602, delivery schedule storing unit 603 and a supplier schedule storing unit 604. In more detail, the stock level storing unit 602 is arranged to store information indicative of the number of each different item stored in each fulfilment centre. In this way, the stock level of each individual type of item can be assessed by the scheduling unit 601 across all of the fulfilment centres. The delivery schedule storing unit 603 is arranged to store information indicative of the scheduled transhipping occurring between fulfilment centres. For example, the information may comprise information that vehicles are to move between fulfilment centres every four hours. In more detail, the schedule information may comprise the times at which vehicle is due to leave each fulfilment centre and expected to arrive at a destination fulfilment centre. With reference to FIG. 5, the information may comprise information that vehicle 303*ba* is due to leave the second fulfilment centre 302*b* at 1 μm and due to arrive at first fulfilment centre 302*a* at 2 pm on a particular day. It is envisaged that the level of detail of such information may comprise detail at a day, month or yearly level. For example, the schedule on a weekend may be different as compared to a weekday schedule. Similarly, the schedule in the summer months may be different from the winter months or around national holidays. In this way, the scheduling unit 601 is arranged to determine the availability for placing items onto incoming/outgoing vehicles as required by customer orders at a particular fulfilment centre.

The supplier schedule storing unit 604 is arranged to store information indicative of scheduled deliveries of items from each supplier. Additionally, the supplier schedule storing unit 604 may further store information indicative of the potential for scheduled deliveries of items from each supplier. Each supplier of items to the network of fulfilment centre supplies those items according to a predetermined schedule. For example, Supplier A may supply the carton items weekly on Mondays and Thursdays. Such information is stored in the supplier schedule storing unit 604. Moreover, such a supplier may further have availability to increase the scheduled deliveries, such as additionally delivering items on Wednesdays. Such possibilities are additionally stored in the supplier schedule storing unit 604. Moreover, information may be stored concerning the number of items included in each delivery. In addition, the schedule may specify the life of the item being delivered, for example, if fresh produce is being delivered, it may be specified that the items of fresh produce have a life (until the produce must be disposed of) of three days.

The scheduling unit 601 is thereby arranged to determine batch schedules based on the information stored in the stock level storing unit 602, delivery schedule storing unit 603 and supplier schedule storing unit 604. In this way, assessments can be made as to the total stock holding of particular items in the network of fulfilment centres based on time and the possibility for the movement of stock around the network of fulfilment centres.

The forecasting unit 605 is arranged to forecast the number and types of items which will be required to be shipped to customers/stores from the network of fulfilment centres in a particular time period. To achieve this, the forecasting unit 605 uses information from the long term forecast storing unit 606 and the promised orders storing unit 607. In this way, the expected demand for each type of item from each fulfilment centre can be calculated. In one example, the forecasting may predict the demand for every item, at every fulfilment centre for a particular time period (for example, for the next 35 days).

Optionally, the forecasting unit 605 may base its forecasting on safety stock held by each fulfilment centre. In more detail, each fulfilment centre may be required to hold a particular amount of safety stock of items such that sudden and unexpected increases in orders of particular items can be handled without exhausting all stock of an item in the fulfilment centre and without requiring the immediate resupply from other fulfilment centres. To this end, the forecasting unit 605 may be arranged to base its forecast on the mean and standard deviation of safety stock.

The long term forecast storing unit 606 is arranged to store information indicative of expected trends for the demand of each item in the fulfilment centres. Such information may be based on previously observed demand for items which have been ordered by customers/stores. For example, it may be noticed that in the summer months items are order which are appropriate for hotter weather (such as barbeque items) whilst in the winter months other different items are ordered suitable for colder weather. It is envisaged that such information may be stored to a level of granularity as required by the forecasts. For example, it may store information that a national holiday is approaching which may alter the purchasing habits of customers/stores. In this regard, the long term forecast storing unit 606 is arranged to store information to make the prediction of demand for items possible.

The promised orders storing unit 607 is arranged to store information indicative of the items which a customer/store has been assigned to an order. For example, a website may be provided through which customers can order items. To achieve this, the customer may select those items which are to be purchased and places them in a virtual shopping basket after which the customer may proceed through an online checkout to pay for the items before the website confirms the orders and commands its dispatch. To this end, the promised orders storing unit 607 may be arranged to store information as promised orders when an item has been added to a virtual shopping basket prior to the online checkout. In this way, the promised orders storing unit 607 is arranged to store information which indicates those items promised to customers/stores based on selections made by the customers/stores.

Therefore, the forecasting unit 605 is arranged to make determinations of the demand required for particular items from the network of fulfilment centres based on the expected demand determined from the long term forecast storing unit 606 and based on information about those items promised to customers as stored in the promised orders storing unit 607. Therefore, the forecasting unit 605 can predict the demand for each item from the fulfilment centres for a particular time period. The forecasting unit 605 may use historical forecasts and a forecast error model to generate forecasts and actuals of the desired variability and error. The forecasting unit 605 may be arranged to forecast the demand for items across the entire network of fulfilment centres and/or forecast the demand for items from a single fulfilment centre.

The projecting unit 608 is arranged to predict the items required to fulfil customer/store orders and where such items should be located (for example, in which fulfilment centre the items should be located) based on the output of the scheduling unit 601 and the forecasting unit 605. In particular, the projecting unit 608 is arranged to determine the requirement for items to be received from outside of the network of fulfilment centres (by way of ordering from suppliers) and the requirement for items to be moved around the network of fulfilment centres. To this end, the projecting unit 608 is arranged to interact with a transhipping unit 609 and an ordering unit 610. In particular, the projecting unit 608 is arranged to instruct the transhipping unit 609 to tranship items from one fulfilment centre to another fulfilment centre as required by the expected demand of such items from particular fulfilment centres in a particular time period. Moreover, the projecting unit 608 is further arranged to interact with the ordering unit 610 to order additional stock of items from outside of the network of fulfilment centres from suppliers.

Therefore, the transhipping unit 609 is arranged to instruct particular fulfilment centres to move a determined number of items from one fulfilment centre to another fulfilment centre by way of vehicles leaving each fulfilment centre on a predetermined schedule. Such instruction may be achieved by way of technical means at each fulfilment centre which are arranged to move containers of items from one location to another at which items may be picked by robotic means before being automatically placed into vehicles (which in turn may be autonomous vehicles) for transport to another fulfilment centre. The transhipping unit 609 may be further arranged to optimise the shipment of items so as to reduce the number of vehicles that are required to transport items between fulfilment centres. The autonomous vehicles may be orchestrated, swarmed, platooned or the like.

Moreover, the ordering unit 610 is arranged to instruct external suppliers to deliver a certain number of items to a particular fulfilment centre (such as the parent fulfilment centre for the particular item). To achieve this, the stock, deliveries, external order schedules are combined to create batches by the scheduling unit 601. Batches are combined with total forecasts by the projecting unit 608 to create stock projections. Stock projections are used to decide an amount of items to order. Preferably, the ordering unit 610 may use the information indicative of the supplier schedules, as stored in the supplier schedule storing unit 604, to determine the number of items to be ordered from a particular supplier. In this way, the timing of possible delivery of such items from the supplier is taken into account.

As described previously, the use of a network of fulfilment centres arranged to share stock there between provides a large assortment of items for customers/stores which are provided at a high availability. Moreover, such a network shortens the supply chain and permits delivery within all of the target time periods, namely, immediately (within one hour), short lead time (between one and four hours), same day delivery (typically delivery in 4 or more hours) and next day delivery.

Figure 7:
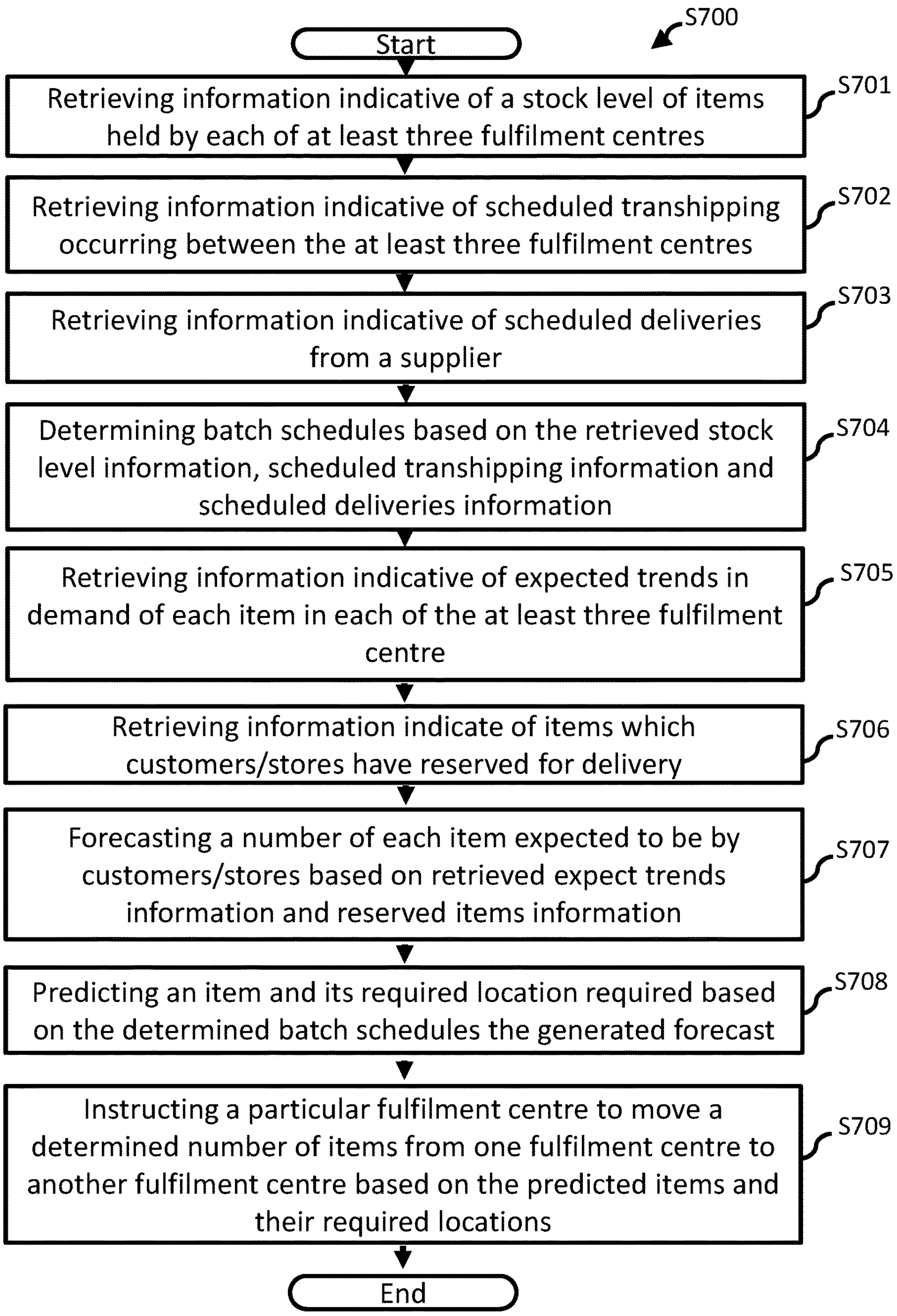
FIG. 7 is a flowchart showing the operations performed by a control unit according to a first embodiment of the present invention.

FIG. 7 is a flowchart S700 showing the steps performed by a control unit arranged to control the system of fulfilment centres as previously described.

At step S701 information is retrieved indicative of a stock level of items held by each of at least three fulfilment centres. In this way, information is received which indicates a current number of items in stock for each fulfilment centre. This information may be as detailed as to include the number of each type of item (each stock keeping unit) in each fulfilment centre e.g. the number of jar items in each of the fulfilment centres. Moreover, such information may indicate the time remaining until each item must be purged from the fulfilment centre I.e. the life of the item before which its consumption/use must be avoided. This is particularly the case with grocery items which become harmful for health if consumed after a particular time period.

At step S702 information is retrieved indicative of scheduled transhipping occurring between the at least three fulfilment centres. In this regard, schedules of upcoming transhipping occurring between fulfilment centres is determined. For example, if vehicles move between fulfilment centres on a predetermined schedule then such information would be retrieved. It is envisaged that the schedules may vary depending on the day and month in which the information is retrieved. For example, the movement schedule during summer months may be different to that of the winter months. Additionally, the movement schedule on weekends may differ from weekdays. Moreover, the information may include the availability/space on each vehicle for further items which may be transported in the future.

At step S703 information is retrieved indicative of scheduled deliveries from an external supplier. External suppliers to the network of fulfilment centres may deliver items to the network on predetermined schedules indicating a level of detail such as time, day of the week/month/year on which deliveries occur. Moreover, such detail may also include the number and type of item which are to be delivered. Where relevant the information may also include the lifetime of the items being delivered before which the items must be purged. The information may also indicate possibilities for additional deliveries by such a supplier I.e. availability for additional deliveries from the supplier.

At step S704 batch schedules are determined based on the retrieved stock level information, scheduled transhipping information and scheduled deliveries information. In this way, the available stock level of each item for each fulfilment centre is determined by taking into account the current stock level in each fulfilment centre, together with deliveries from suppliers and transhipping.

At step S705 information is retrieved indicative of expected trends in demand of each item in each of the at least three fulfilment centres. In this regard, the information may take into account previous sales records of each item from each fulfilment centre. Moreover, the time of year may be taken into account with sales of particular items being different in, for example, summer months as compared to the winter months.

At step S706 information is retrieved indicative of items which customers/stores have reserved. In this regard, customers/stores may have already reserved certain items (for example on the telephone, via email and/or via website interface and/or via a smartphone app) for delivery at a future time. Therefore, stock must be assigned to ensure these orders are fulfilled and avoid the risk of double selling a particular item. In this way, the information retrieved indicates the number of items and the types thereof which have been assigned to customer/store's orders. It is envisaged that in this context 'reserved' may mean that the items have been reserved at a particular fulfilment centre at which they will be picked.

As step S707 a number of each item expected to be demanded by customers/stores is forecasted based on retrieved expect trends information and reserved items information. In this way, for a particular time period, the number of type of each item expected to be demanded by customers/stores is predicted. More specifically, using the information of expected trends and those items which have already been assigned for orders then the sum of this information provides an indication of the number of items expected to be ordered/dispatched in a given time period and from which location i.e. which fulfilment centre. In this context, forecasting may be performed over a number of fulfilment centres such as the entire network of fulfilment centres.

At step S708 the items required and the location at which each item is required to be is predicted based on the determined batch schedules the generated forecast. In particular, step S707 has forecast the number of items which are to be dispatched/ordered from each fulfilment centre. This information is combined with the information about incoming deliveries and current stock level from step S704. In this way, the total number of a particular item at a particular fulfilment centre is known together with information about forecast demand for such a particular item from the particular fulfilment centre. Thereby the number of items required to be moved/re-located to ensure that the stock level of item is sufficient to meet the expected orders/deliveries can be predicted by step S708. Optionally, the batch schedules may be determined in advance and then constantly iterated up to the point at which no further changes are permitted. In this way the batch schedule need not be calculated anew for every change which occurs.

At step S709 a particular fulfilment centre is instructed to move a determined number of items from one fulfilment centre to another fulfilment centre based on the predicted items and their required locations. In this way, items of stock which are expected/known to be demanded by customers/stores is re-located to locations from which fulfilment is expected to take place. For example, of a same day delivery of items is expected to be placed by a customer then sharing of stock from other fulfilment centres may be required to ensure enough stock is available at the closest fulfilment centre to ensure such a delivery can be met. Typically, this requires transhipping stock from neighbouring fulfilment centres as performed by step S709.

Optionally, the further step of instructing an external supplier to deliver a particular number of items to a particular fulfilment centre based on the predicted items and their required locations may be performed. Where there is insufficient stock in the network of fulfilment centres to fulfil all of the orders expected/known to occur in a particular time period then external stock may be sourced from a supplier. This this end, instructions may be sent to such external suppliers with information such as the number, type, life of stock which is to be delivered at a particular time. Such deliveries may take into account supplier schedules which indicates the availability of suppliers to make additional deliveries of stock.

Availability to Promise

Figure 8:
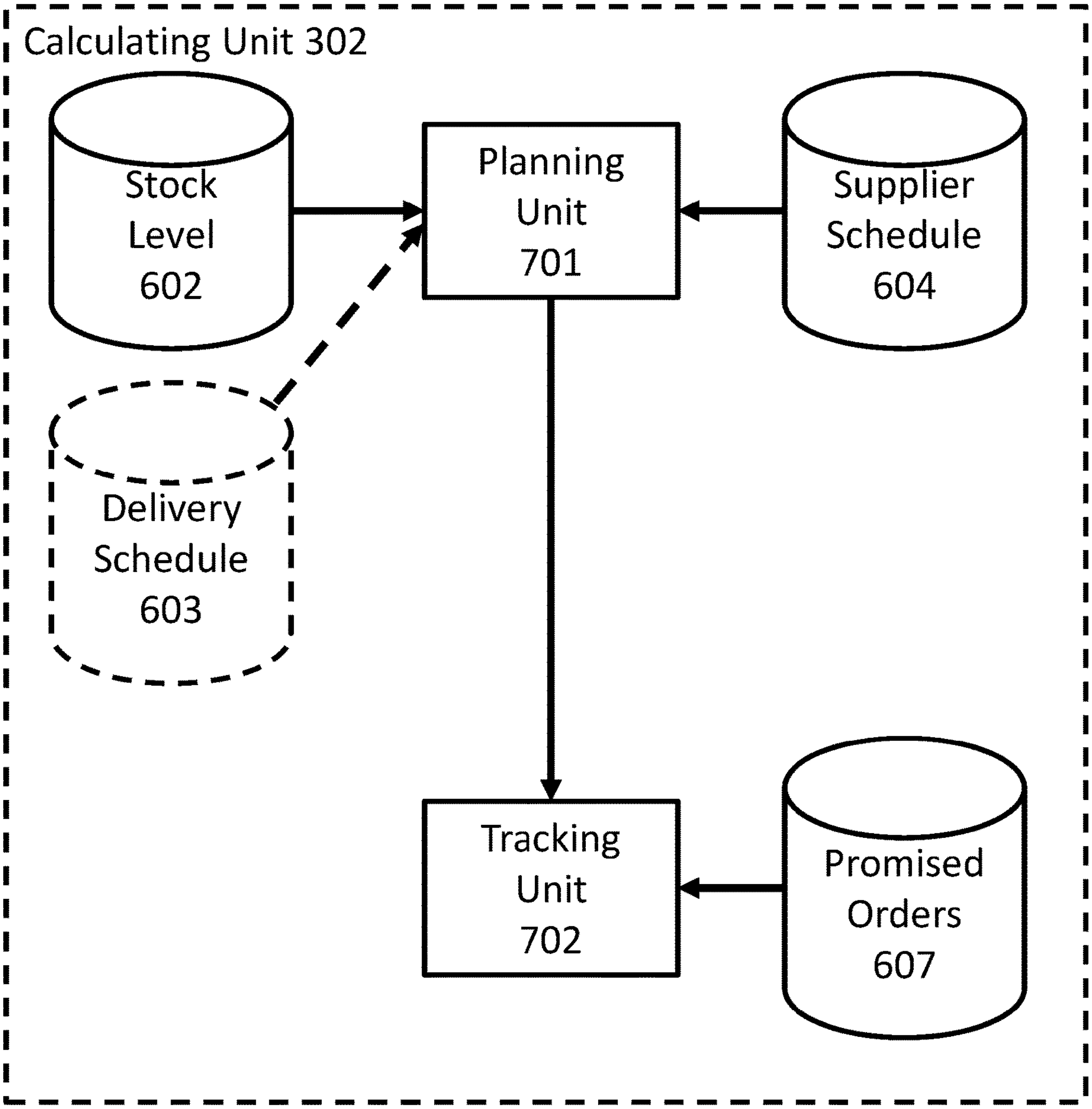
FIG. 8 is a schematic diagram of components utilised in a calculating unit according to a first embodiment of the present invention.

FIG. 8 shows a calculating unit 302 according to a first embodiment of the present invention. The calculating unit 302 is arranged to determine the availability of particular items to thereby determine whether such items can be offered to customers/stores. For example, in a simple example, if a carton item is currently out of stock then it cannot be offered as available for order by a customer or store. Otherwise, since such an item is not in stock, then it cannot be shipped to the customer leading to a reduced customer satisfaction. Given the increased complexity of the network according to the first embodiment of the present invention, because it includes multiple fulfilment centres storing stock, such a determination is carefully calculated by the calculating unit 302. To this end, the calculating unit 302 is arranged to determine the current stock availability of each item to thereby determine whether it can or cannot be offered to customers.

To achieve this, the calculating unit 302 comprises a planning unit 701 arranged to receive information from a stock level storing unit 602, a supplier schedule storing unit 604 and, optionally, a delivery schedule storing unit 603.

The calculating unit 302 further comprises a tracking unit 702 arranged to receive the output of the planning unit 701 together with information from a promised orders storing unit 607.

In more detail, the planning unit 701 is similar to the scheduling unit 601 as described with regards to FIG. 6. In particular, the planning unit 701 is arranged to determine batch schedules which relate to the amount of stock of each item held in each fulfilment centre together with information about stock arriving from suppliers and, optionally, for each fulfilment centre, whether stock is available to arrive in a vehicle by way of transhipping. To this end, the planning unit 701 is arranged to communicate with a stock level storing unit 602, (optional) delivery schedule storing unit 603 and a supplier schedule storing unit 604. As described previously, the stock level storing unit 602 is arranged to store information indicative of the number of each different item stored in each fulfilment centre. In this way, the stock level of each individual type of item can be assessed by the planning unit 701 across all of the fulfilment centres. The delivery schedule storing unit 603 is arranged to store information indicative of the scheduled transhipping occurring between fulfilment centres. The supplier schedule storing unit 604 is arranged to store information indicative of scheduled deliveries of items from each supplier. Additionally, the supplier schedule storing unit 604 may further store information indicative of the potential for scheduled deliveries of items from each supplier. Each supplier of items to the network of fulfilment centre supplies those items according to a predetermined schedule. Information may also be stored concerning whether the supplier can accommodate additional deliveries.

The planning unit 701 is thereby arranged to determine batch schedules based on the information stored in the stock level storing unit 602, (optional) delivery schedule storing unit 603 and supplier schedule storing unit 604. In this way, assessments can be made as to the total stock holding of particular items in the network of fulfilment centres based on time and the possibility for the movement of stock around the network of fulfilment centres.

In particular, when employed in a network of fulfilment centres as previously described, information from the delivery schedule storing unit 603 is preferably included in the calculation of batch schedules to provide a more accurate determination of the availability of items based on which items may be transhipping from neighbouring fulfilment centres. However, the calculating unit 302 may also be employed in a hub and spoke (centralised model) network of fulfilment centres with one relatively large fulfilment centres supplying a number of relatively small fulfilment centres. To this end, in a hub and spoke network, transhipping is not used to move items between fulfilment centres. Therefore, the delivery schedule storing unit 603 is not used for calculating batch schedules in a hub and spoke network.

The tracking unit 702 is arranged to receive the batch schedules determined by the planning unit 701. Moreover, the tracking unit 702 is arranged to receive information indicative of the items which a customer/store has been assigned to an order from the promised orders storing unit 607. As described previously, the promised orders storing unit 607 stores information indicative of information as promised to customers/stores based on, for example, the content of virtual shopping baskets and/or confirmed customer/store orders.

The tracking unit 702 is arranged to calculate the availability of each item in the fulfilment centres based on the received information. In this way, the availability of stock to customers/stores within range of a particular fulfilment centre may be calculated because the tracking unit 702 has calculated the availability of stock for each item in each fulfilment centre (including the ability to add to the stock in each fulfilment centre by transhipping or ordering). In particular, the calculating unit 302 uses the batch scheduling information to ascertain the current stock holding level of each item in each fulfilment centre taking into account the ability to tranship and/or order additional stock from external suppliers. Moreover, the tracking unit 702 subtracts those items promised to customers/stores based on the information from the promised orders storing unit 607. In this way, the amount of stock of each item available to be ordered by a customer/store is calculated. Moreover, such availability is updated as new orders from customers/stores are accepted.

In this regard, Availability to Promise is calculated, in a mesh network, according to whether an item can be shipped from any fulfilment centre in the network prior to dispatch to a customer or whether (for example, for orders requiring delivery within one hour) the items must be limited to those currently in present in the stock of a particular fulfilment centre. To this end, Availability to Promise may utilise information about items which are promised to be shipped into and out of a fulfilment centre.

Moreover, Availability to Promise may be calculated based on the life of particular items. For example, for fresh produce, each item may have a predetermined life after which it must be discarded (also referred to as purged). Therefore, the Availability to Promise may also be based on the life of items. In this regard, items may be preferably shipped to customers which are the first to require purging i.e. it may be preferable to ship to customers those items with 4 days of life remaining rather than 5 days of life so that the stock may be maintained in the fulfilment centre for as long as possible.

The tracking unit 702 may be further arranged to calculate those items which 'could' be moved, in this way more nuanced decisions about what will be moved where, recognising that stock in multiple locations at the same times may be transferred to customers and balancing all customers interests and economics in the most optimal manner.

Furthermore, when it is determined that demand for particular items exceeds the stock available then additional stock may be ordered into the parent fulfilment centre and/or the picking fulfilment centre for that item. In this way, demand across the network of fulfilment centres can be met.

Figure 9:
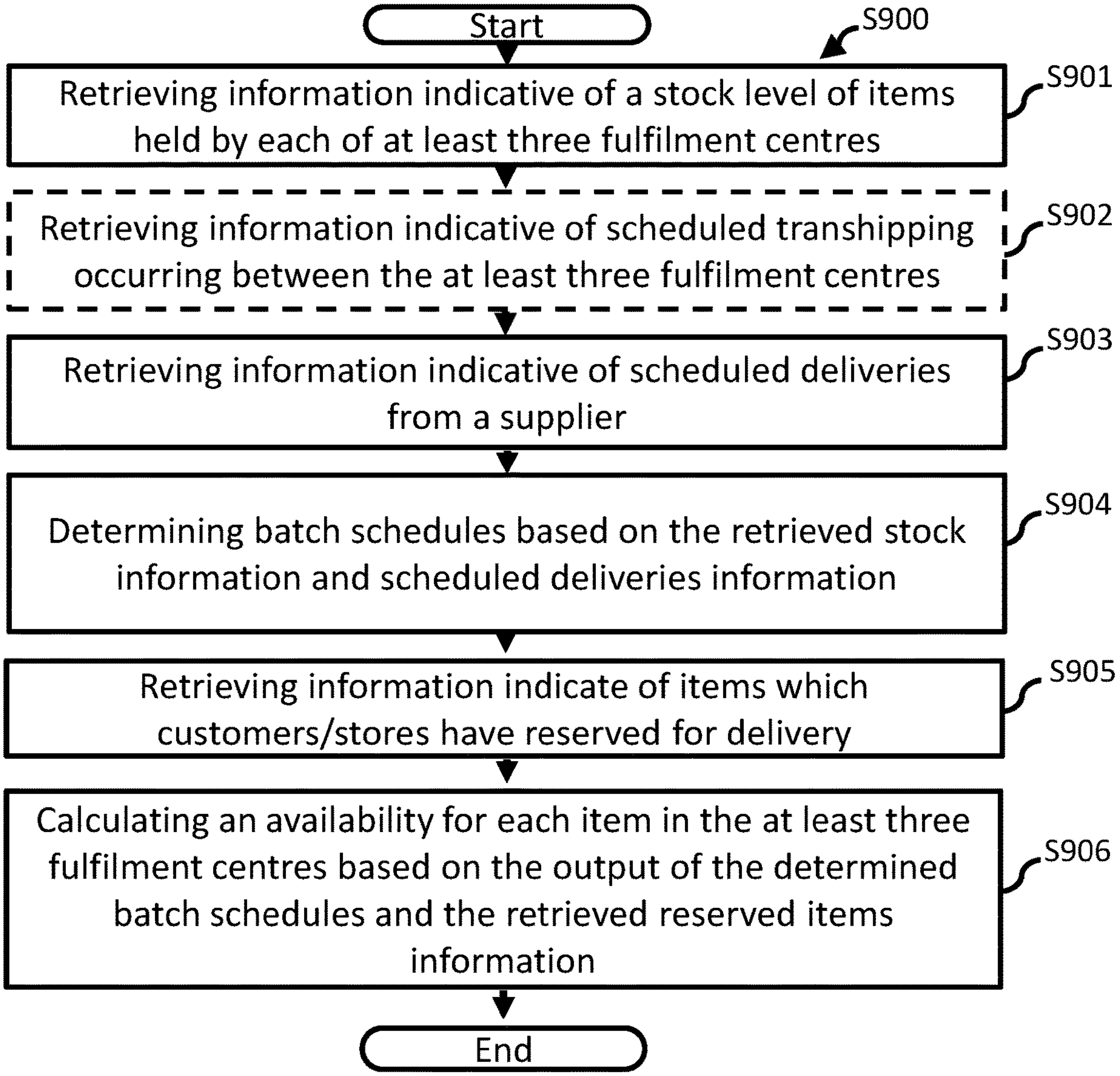
FIG. 9 is a flowchart showing the operations performed by a calculating unit according to a first embodiment of the present invention.

FIG. 9 is a flowchart S900 showing the steps performed by a calculating unit for determining the availability of particular items in the system of fulfilment centres as previously described.

At step S901 information is retrieved indicative of a stock level of items held by each of at least three fulfilment centres. In this way, information is received which indicates a current number of items in stock for each fulfilment centre. This information may be as detailed as to include the number of each type of item (each stock keeping unit) in each fulfilment centre e.g. the number of carton items in each of the fulfilment centres. Moreover, such information may indicate the time remaining until each item must be purged from the fulfilment centre i.e. the life of the item before which its consumption/use must be avoided. This is particularly the case with grocery items which become harmful for health if consumed after a particular time period.

Optionally, at step S902 information is retrieved indicative of scheduled transhipping occurring between the at least three fulfilment centres. In this regard, schedules of upcoming transhipping occurring between fulfilment centres is determined. For example, if vehicles move between fulfilment centres on a predetermined schedule then such information would be retrieved. It is envisaged that the schedules may vary depending on the day and month in which the information is retrieved. For example, the movement schedule during summer months may be different to that of the winter months. Additionally, the movement schedule on weekends may differ from weekdays. Moreover, the information may include the availability/space on each vehicle for further items which may be transported in the future. Step S902 may be employed in networks which involve transhipping of items between fulfilment centres, such as the mesh type network previously described. However, in other network types (such as hub and spoke networks) then this step may not be employed because transhipping does not occur in those networks.

At step S903 information is retrieved indicative of scheduled deliveries from an external supplier. External suppliers to the network of fulfilment centres may deliver items to the network on predetermined schedules indicating a level of detail such as time, day of the week/month/year on which deliveries occur. Moreover, such detail may also include the number and type of item which are to be delivered. Where relevant the information may also include the lifetime of the items being delivered before which the items must be purged. The information may also indicate possibilities for additional deliveries by such a supplier I.e. availability for additional deliveries from the supplier.

At step S904 batch schedules are determined based on the retrieved stock level information, scheduled deliveries information and, optionally, scheduled transhipping information. In this way, the available stock level of each item for each fulfilment centre is determined by taking into account the current stock level in each fulfilment centre, together with deliveries from suppliers and, optionally, transhipping.

At step S905 information is retrieved indicative of items which customers/stores have reserved. In this regard, customers/stores may have already reserved certain items (for example on the telephone, via email and/or via website interface) for delivery at a future time. Therefore, stock must be assigned to ensure these orders are fulfilled and avoid the risk of double selling a particular item. In this way, the information retrieved indicates the number of items and the types thereof which have been assigned to customer/store's orders.

At step S906 availability for each item in each of the at least three fulfilment centres is calculated based on the determined batch schedules and the retrieved reserved items information. It is important that customers/stores are only offered to ability to have shipped those items which are available to be shipped. Therefore, the calculation of availability ensures that products are available for shipment before the order from the customer/store is placed. If an item is not available then it may not be offered for shipment to a customer/store. To achieve this, step S906 determines the availability of an item at a particular fulfilment centre based on the current stock level of the item in the fulfilment centre, whether additional stock will/can be delivered from an external supplier and, optionally, whether additional stock will/can be delivered from neighbouring fulfilment centres (i.e. those in the network of fulfilment centres). Such data is processed by step S904 to form batch schedules. This information is combined with information about items which have already been reserved by customers/stores and are therefore unavailable. The combination of this information provides the availability for each item in each fulfilment centre.

With respect to computer-implemented embodiments, the description provided may describe how one would modify a computer to implement the system or steps of a method. The specific problem being solved may be in the context of a computer-related problem, and the system may not be meant to be performed solely through manual means or as a series of manual steps. Computer-related implementation and/or solutions may be advantageous in the context of some embodiments; at least for the reasons of providing scalability (the use of a single platform/system to manage a large number of inputs and/or activities); the ability to pull together quickly and effectively information from disparate networks; improved decision support and/or analytics that would otherwise be unfeasible; the ability to integrate with external systems whose only connection points are computer-implemented interfaces; the ability to achieve cost savings through automation; the ability to dynamically respond and consider updates in various contexts (such as quickly changing order flow or logistical conditions); the ability to apply complex logical rules that would be infeasible through manual means; the ability for orders to be truly anonymous; among others.

Using electronic and/or computerised means can provide a platform that may be more convenient, scalable, efficient, accurate, and/or reliable than traditional, non-computerised means. Further, systems may be computerised and the platform may advantageously be designed for interoperability, and manual operation may be difficult and/or impossible. Further, manual operation, even if feasible, is unlikely to achieve comparable efficiency and/or Scalability may be useful as it may be advantageous to provide a system that may be able to effectively manage a large number of inputs, outputs and/or interconnections and/or integration with external systems.

The convenience and effectiveness of a solution may be valuable in the context of order fulfilment as individuals may have more information available to make better ordering and/or fulfilment decisions. Moreover, such a solution is envisaged to be integrated into a fully automated system in which no human intervention is required to achieve optimum ordering/fulfilment decisions.

Figure 10:
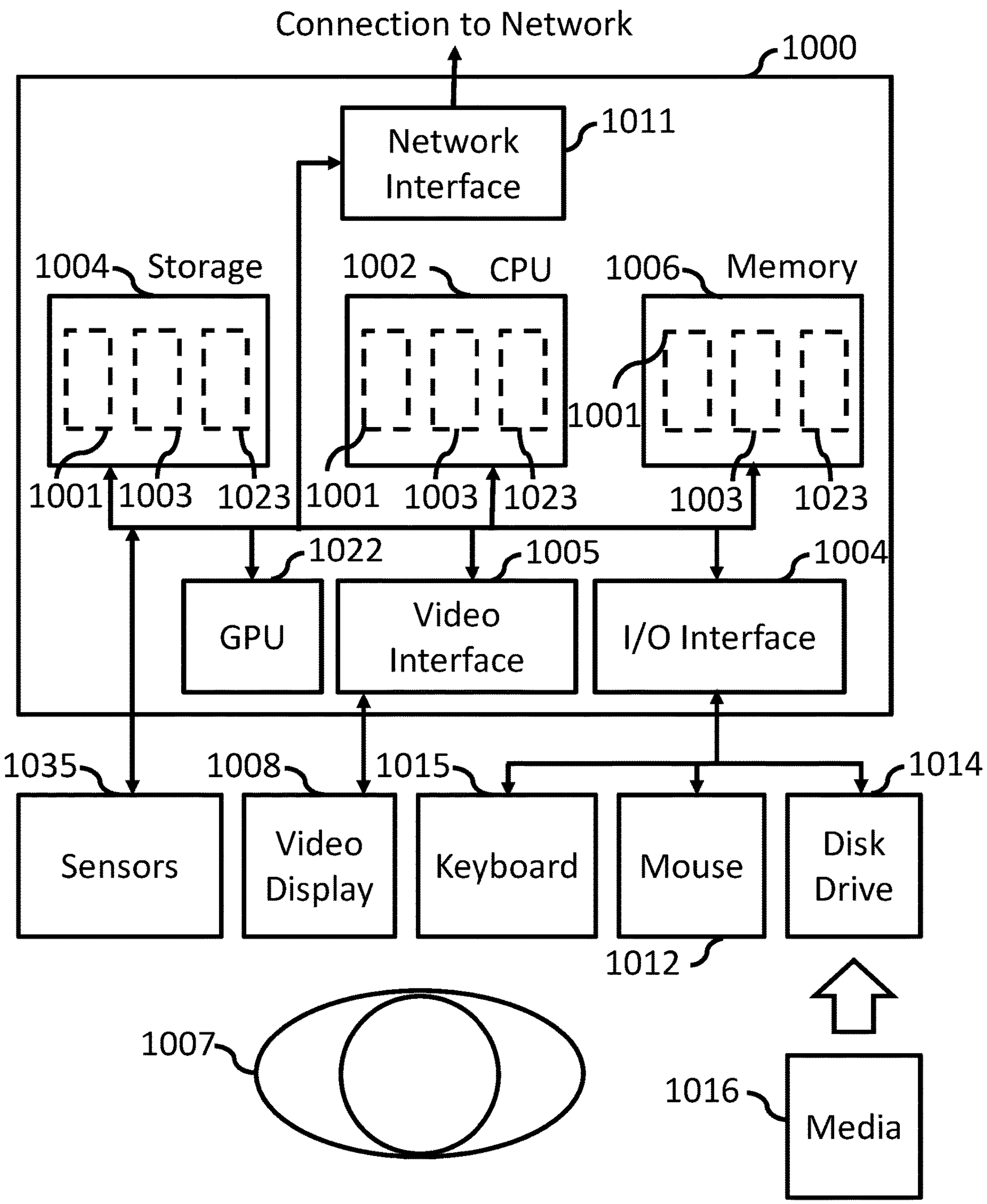
FIG. 10 is an example of a computer system arranged to implement at least one of the control unit and the calculating unit according to a first embodiment of the present invention.

The present system and method may be practiced in various embodiments. A suitably configured computer device, and associated communications networks, devices, software and firmware may provide a platform for enabling one or more embodiments as described above. By way of example, FIG. 10 shows a computer device 1000 that may include a central processing unit ("CPU") 1002 connected to a storage unit 1014 and to a random access memory 1006. The CPU 1002 may process an operating system 1001, application program 1003, and data 1023. The operating system 1001, application program 1003, and data 1023 may be stored in storage unit 1014 and loaded into memory 1006, as may be required. Computer device 1000 may further include a graphics processing unit (GPU) 1022 which is operatively connected to CPU 1002 and to memory 1006 to offload intensive image processing calculations from CPU 1002 and run these calculations in parallel with CPU 1002. An operator 1007 may interact with the computer device 1000 using a video display 1008 connected by a video interface 1005, and various input/output devices such as a keyboard 1015, mouse 1012, and disk drive or solid state drive 1014 connected by an I/O interface 1004. In known manner, the mouse 1012 may be configured to control movement of a cursor in the video display 1008, and to operate various graphical user interface (GUI) controls appearing in the video display 1008 with a mouse button. The disk drive or solid state drive 1014 may be configured to accept computer readable media 1016. The computer device 1000 may form part of a network via a network interface 1011, allowing the computer device 1000 to communicate with other suitably configured data processing systems (not shown). One or more different types of sensors 1035 may be used to receive input from various sources.

The present system and method may be practiced on virtually any manner of computer device including a desktop computer, laptop computer, tablet computer or wireless handheld. The present system and method may also be implemented as a computer-readable/useable medium that includes computer program code to enable one or more computer devices to implement each of the various process steps in a method in accordance with the present invention. In case of more than computer devices performing the entire operation, the computer devices are networked to distribute the various steps of the operation. It is understood that the terms computer-readable medium or computer useable medium comprises one or more of any type of physical embodiment of the program code. In particular, the computer-readable/useable medium can comprise program code embodied on one or more portable storage articles of manufacture (e.g. an optical disc, a magnetic disk, a tape, etc.), on one or more data storage portioned of a computing device, such as memory associated with a computer and/or a storage system.

The mobile application of the present invention may be implemented as a web service, where the mobile device includes a link for accessing the web service, rather than a native application. The functionality described may be implemented to any mobile platform, including the Android platform, iOS platform, Linux platform or Windows platform.

In further aspects, the disclosure provides systems, devices, methods, and computer programming products, including non-transient machine-readable instruction sets, for use in implementing such methods and enabling the functionality described previously.

Modifications and Variations

The above-described network of fulfilment centres is envisaged to be utilised in a number of ways. For example, a single retailer may own, operate and stock all fulfilment centres in a network and utilise external supplier to supply the items stored in the fulfilment centre. In this way, the single retailer may operate the network of fulfilment centres to effectively share stock between fulfilment centres as required to ensure that deliveries to customers/stores may be made within any of previous time frames discussed, such as within one hour, same-day and/or next-day delivery. Alternatively, separate retailers could operate individual fulfilment centres and agree to share stock between fulfilment centres to meet the necessary demand from each fulfilment centre. Alternatively or additionally, each fulfilment centre may store items from one or several retailers and share them with other fulfilment centre operated by the same or a different retailer.

Moreover, although a network of three fulfilment centres has previously been described in the preceding description it is envisaged that other number of fulfilment centres may be used depending on the particular circumstances of deployment. In particular, the network may be formed of two fulfilment centres instead of three. In addition, the sizing of each fulfilment centre may be changed according to the particular circumstances of deployment. For example, at least one of the fulfilment centres may be particularly small and positioned close to customer locations to achieve expedited delivery of items. In addition, at least one of the fulfilment centres may be large and suited for longer term deliveries and positioned further away from customers. In this way, the network may be adapted for particular use in particular applications.

Although the term 'item' has been used throughout the description it is envisaged to include other terms such as case, asset, unit, pallet, equipment or the like.

The foregoing description of embodiments of the invention has been presented for the purpose of illustration and description. It is not intended to be exhaustive or to limit the invention to the precise form disclosed. Modifications and variations can be made without departing from the spirit and scope of the present invention.

The invention claimed is:

1. A control unit including a processor for automated control of a logistical system, the logistical system comprising:

at least three fulfilment centers, each fulfilment center being a peer node in a non-hierarchical mesh network, and each fulfilment center being configured and arranged to schedule and fulfil orders to customers and/or stores; and wherein the control unit is configured and arranged to control the at least three fulfilment centers;

wherein each of the at least three fulfilment centers is controlled by the control unit to share items with at least one other of the at least three fulfilment centers via scheduled, bidirectional transhipping along predetermined inter-center transport routes; and wherein the processor is configured and arranged to perform computer-implemented functions of:

a stock level storing unit configured and arranged to store information indicative of a stock level of an item held by each of the at least three fulfilment centers including, for each item, a remaining purge-time value indicative of perishability;

a delivery schedule storing unit configured and arranged to store information indicative of scheduled transhipping occurring between the at least three fulfilment centers according to the predetermined inter-center transport routes;

a supplier schedule storing unit configured and arranged to store information indicative of scheduled deliveries from an external supplier including supplier-specific delivery timing constraints;

a scheduling unit configured and arranged to determine batch schedules for the multi-center mesh network based on the information stored in each of the stock level storing unit, the delivery schedule storing unit, and the supplier schedule storing unit;

a long-term forecast storing unit configured and arranged to store information indicative of expected trends in demand of an item in each of the at least three fulfilment centers;

a promised orders storing unit configured and arranged to store information indicative of an item which customers/stores have reserved;

a forecasting unit configured and arranged to generate a forecast of a number of each item expected to be demanded by customers/stores based on the information stored in each of the long-term forecast storing unit and the promised orders storing unit;

a projecting unit configured and arranged to predict an item required and required locations of the predicted item and to compute, for each item, a required redistribution across the at least three fulfilment centers based on the batch schedules determined by the scheduling unit and the forecast generated by the forecasting unit, and the purge-time value for the item at each fulfilment center; and a transhipping unit configured and arranged to instruct a particular fulfilment center to move a determined number of items from one fulfilment center to another fulfilment center based on an output of the projecting unit by automatically generating machine-readable movement instructions configured for execution by one or more automated transport vehicles operating along the predetermined inter-center transport routes, each machine-readable movement instruction specifying, for each transport vehicle, a load quantity and item composition prioritised according to the purge-time values of items at each source fulfilment center, and a destination fulfilment center.

2. The system according to claim 1, wherein each of the at least three fulfilment centers is configured and arranged to schedule sharing of items by transhipping the items on vehicles, wherein the vehicles are scheduled for travel between the at least three fulfilment centers according to a predetermined schedule.

3. The system according to claim 1, configured for only one of the at least three fulfilment centers to receive a particular item from a particular supplier and to tranship the received particular item to every other fulfilment center.

4. The system according to claim 1, wherein when one of the at least three fulfilment centers requires further items, the control unit is configured to cause another fulfilment center to provide, by transhipping, the required further items.

5. The system according to claim 1, wherein the processor is configured and arranged to:

instruct an external supplier to deliver a particular number of items to a particular fulfilment center based on the output of the projecting unit.

6. The system according to claim 1, further comprising:

a calculating unit configured and arranged to determine an availability of a particular item held by the system, wherein the calculating unit includes a processor configured and arranged to perform computer-implemented functions of:

a stock level storing unit configured and arranged to store information indicative of a stock level of an item held by each of the at least three fulfilment centers including a purge-time value for each item;

a supplier schedule storing unit configured and arranged to store information indicative of scheduled deliveries from an external supplier;

a planning unit configured and arranged to determine batch schedules based on the information stored in each of the stock level storing unit and the supplier schedule storing unit for the multi-center mesh network;

a promised orders storing unit configured and arranged to store information indicative of items which customers/stores have reserved;

a tracking unit configured and arranged to calculate an availability for each item in the at least three fulfilment centers based on an output of the planning unit and the information stored in the promised orders storing unit including adjustment of availability based on the purge-time values to compute a network-wide Availability-to-Promise value for the mesh network.

7. The system according to claim 2, configured for only one of the at least three fulfilment centers to receive a particular item from a particular supplier and to tranship the received particular item to every other fulfilment center.

8. The system according to claim 7, wherein when one of the at least three fulfilment centers requires further items, the control unit is configured to cause another fulfilment center to provide, by transhipping, the required further items.

9. The system according to claim 1, wherein the processor is configured and arranged to perform a computer-implemented function of:

an ordering unit configured and arranged to instruct an external supplier to deliver a particular number of items to a particular fulfilment center based on the output of the projecting unit including selecting the fulfilment center as a delivery destination based on supplier-specific delivery timing constraints, the predetermined inter-center transport routes, and purge-time values for the items to be delivered.

10. The system according to claim 1, wherein the control unit is further configured to maintain a unified, real-time virtual inventory state spanning the at least three physically separate fulfilment centers by continuously reconciling stock level information, scheduled transhipping movements, and promised orders across the non-hierarchical mesh network.

11. The system according to claim 1, wherein the transhipping unit is configured to prioritise, for each transport vehicle movement, dispatch of items having a shorter remaining purge-time value ahead of items having a longer remaining purge-time value, such that items approaching their purge time are redistributed to fulfilment centers for dispatch before items with greater remaining shelf life.

* * * * *